(12) United States Patent
Zhong

(10) Patent No.: US 12,540,702 B1
(45) Date of Patent: Feb. 3, 2026

(54) POWER APPARATUS FOR PIPELINE ENDOSCOPE DEVICE, PIPELINE ENDOSCOPE DEVICE, AND PIPELINE INSPECTION SYSTEM

(71) Applicant: SHENZHEN ANDELIAN TECHNOLOGY CO., LTD., Guangdong (CN)

(72) Inventor: Shaohua Zhong, Guangdong (CN)

(73) Assignee: SHENZHEN ANDELIAN TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/205,082

(22) Filed: May 12, 2025

(30) Foreign Application Priority Data

Apr. 19, 2025 (CN) .......................... 202510496439.6

(51) Int. Cl.
  *F16L 55/32* (2006.01)
  *F16L 55/44* (2006.01)
  *F16L 101/30* (2006.01)
(52) U.S. Cl.
  CPC ............... *F16L 55/32* (2013.01); *F16L 55/44* (2013.01); *F16L 2101/30* (2013.01)
(58) Field of Classification Search
  CPC ........ F16L 55/32; F16L 55/44; F16L 2101/30
  See application file for complete search history.

(56) References Cited

U.S. PATENT DOCUMENTS

| 9,206,938 B2 * | 12/2015 | Thursby | ............... G01M 3/005 |
| 2003/0233894 A1 * | 12/2003 | Tezuka | .................. G01B 7/281 |
| | | | 73/866.5 |

FOREIGN PATENT DOCUMENTS

| CN | 107314191 A | * | 11/2017 | ............. F16L 55/28 |
| CN | 110657315 A | * | 1/2020 | ............. F16L 55/32 |
| CN | 116557680 A | * | 8/2023 | ............. F16L 55/40 |
| KR | 102233656 B1 | * | 3/2021 | ............. F16L 55/30 |
| WO | WO-2023193968 A1 | * | 10/2023 | ............. F16L 55/40 |

* cited by examiner

*Primary Examiner* — Laura Martin
*Assistant Examiner* — Anthony W Megna Fuentes
(74) *Attorney, Agent, or Firm* — HOWARD M COHN and Associates, LLC

(57) ABSTRACT

A power apparatus for a pipeline endoscope device, a pipeline endoscope device, and a pipeline inspection system are provided. The pipeline endoscope device includes a power apparatus, and an endoscope assembly. The power apparatus includes a driven module, a driving module, and an elastic connector. The driven module includes a driven housing and multiple driven support wheel sets, the multiple driven support wheel sets are mounted on the driven housing, an opening angle of the driven support wheel set relative to the driven housing is adjustable. The driving module includes a driving housing, a driving wheel, and a driving support wheel set, the driving wheel is mounted on the driving housing, the driving support wheel set is mounted on the driving housing, and an opening angle of the driving support wheel set relative to the driving housing is adjustable.

18 Claims, 13 Drawing Sheets

POWER APPARATUS FOR PIPELINE ENDOSCOPE DEVICE, PIPELINE ENDOSCOPE DEVICE, AND PIPELINE INSPECTION SYSTEM

CROSS-REFERENCE TO RELATED APPLICATION

The application claims priority of Chinese patent application CN2025104964396, filed on Apr. 19, 2025, which is incorporated herein by reference in its entireties.

TECHNICAL FIELD

The present disclosure relates to the technical field of pipeline survey, and in particular to a power apparatus for a pipeline endoscope device, a pipeline endoscope device, and a pipeline inspection system.

BACKGROUND

Pipeline endoscope device (such as a pipeline robot) is an intelligent device capable of performing autonomous traveling, detection, maintenance, cleaning and other operations in the pipeline. Pipeline endoscope device includes a wheeled pipeline robot and a tracked pipeline robot. However, the wheeled pipeline robot in the related art is prone to unsteady traveling when traveling in the pipeline due to its own structural design. Therefore, how to effectively improve the traveling stability of the wheeled pipeline robot in the pipeline has become an urgent problem to be solved.

SUMMARY

An embodiment of the present disclosure provides a power apparatus for a pipeline endoscope device, a pipeline endoscope device, and a pipeline inspection system, which can solve the problem that the wheeled pipeline robot in the related art is prone to unsteady traveling when traveling in the pipeline due to its own structural design.

In a first aspect, the present disclosure provides a power apparatus for a pipeline endoscope device, and the pipeline endoscope device includes a power apparatus, and an endoscope assembly. The power apparatus includes a driven module, a driving module, and an elastic connector. The driven module includes a driven housing and multiple driven support wheel sets, the multiple driven support wheel sets are mounted on the driven housing, an opening angle of the driven support wheel set relative to the driven housing is adjustable, and the endoscope assembly is mounted on the driven housing. The driving module includes a driving housing, a driving wheel, and a driving support wheel set, the driving wheel is mounted on the driving housing, the driving support wheel set is mounted on the driving housing, and an opening angle of the driving support wheel set relative to the driving housing is adjustable. The elastic connector located between the driven housing and the driving housing and connected to the driven housing and the driving housing. When the power apparatus travels in a pipeline, the driving wheel, the driven support wheel set and the driving support wheel set are configured to make contact with an inner wall surface of the pipeline.

In a second aspect, the present disclosure provides a pipeline endoscope device. The pipeline endoscope device includes an endoscope assembly, and the power apparatus described above. The endoscope assembly is mounted in a driven housing, and is configured to survey relevant data in the pipeline.

In a third aspect, the present disclosure provides a pipeline inspection system, including an electric control module, an external cable, and the pipeline endoscope device described above. The pipeline endoscope device is connected to the electric control module by the external cable.

Based on the power apparatus in an embodiment of the present disclosure, by designing the driving wheel and making an opening angle of the driving wheel relative to the driving housing non-adjustable, when the power apparatus travels in the pipeline, the driving wheel may also play a role in stably supporting the driving housing while making contact with the inner wall surface of the pipeline, thereby effectively ensuring traveling stability of the power apparatus in the pipeline. By designing the driven support wheel set and the driving support wheel set and making an opening angle of the driven support wheel set relative to the driven housing non-adjustable, and an opening angle of the driving support wheel set relative to the driving housing adjustable, the driving support wheel set and the driving support wheel set can be adjusted to appropriate opening angles to adapt to pipelines with different pipe diameters, so that when the power apparatus travels in the pipeline, the driven support wheel set and the driving support wheel set can make contact with the inner wall surface of the pipeline so as to cooperate with the driving wheel, enabling the power apparatus to travel freely in the pipeline.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
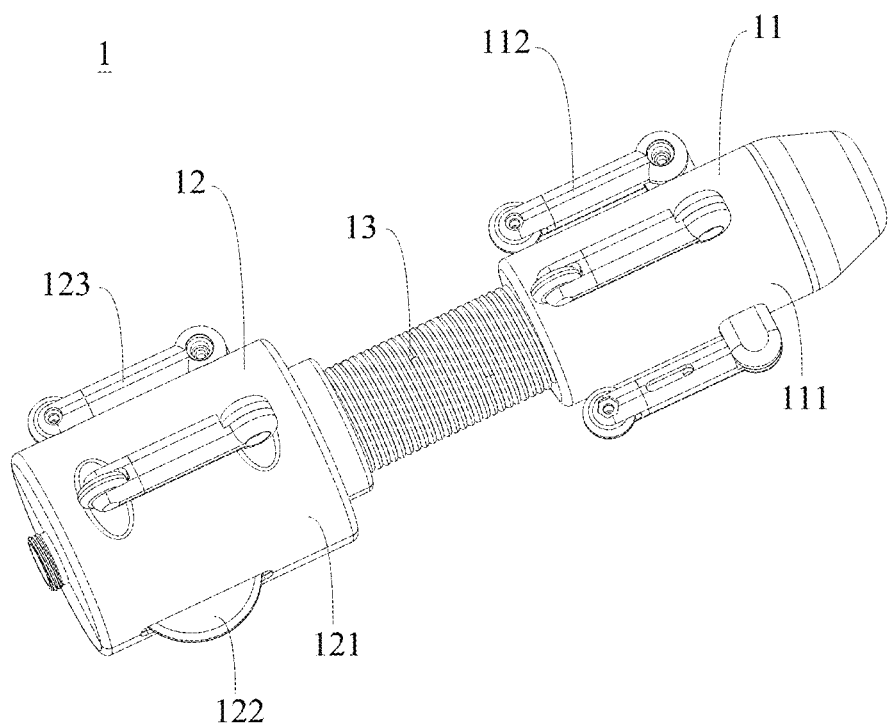
FIG. 1 is a structural diagram of a power apparatus according to an embodiment of the present disclosure.
Figure 2:
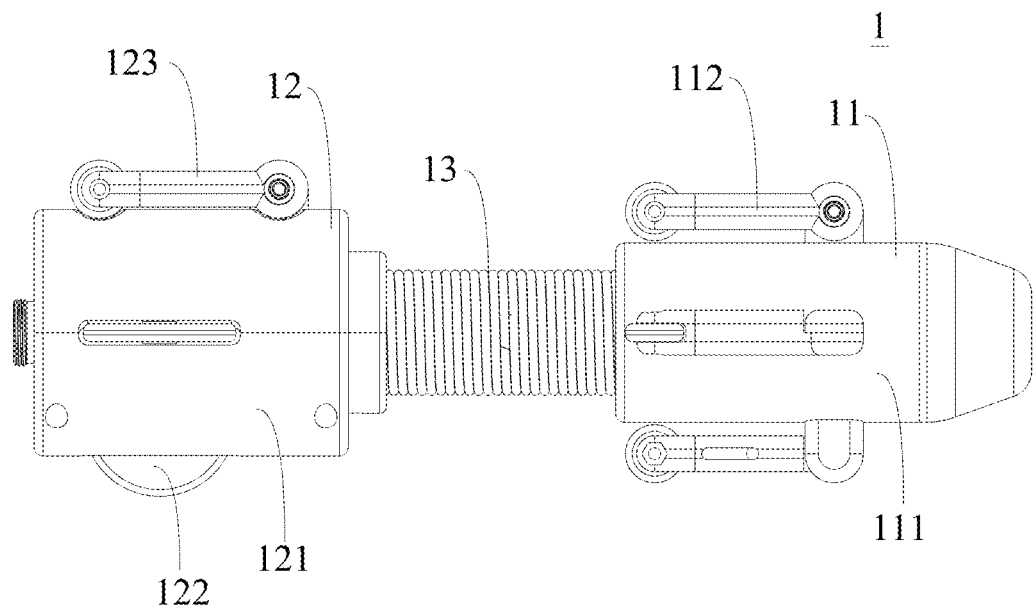
FIG. 2 is a structural diagram of the power apparatus in FIG. 1 from another perspective.
Figure 3:
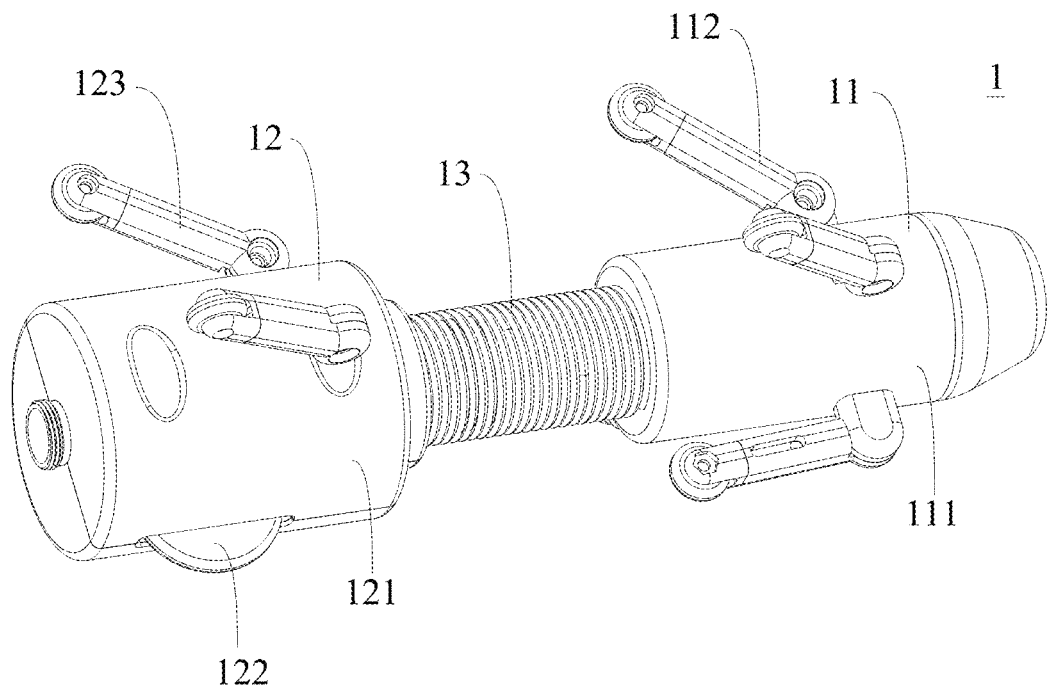
FIG. 3 is a structural diagram of a driving support wheel set and a driven support wheel set according to an embodiment of the present disclosure after being opened.
Figure 4:
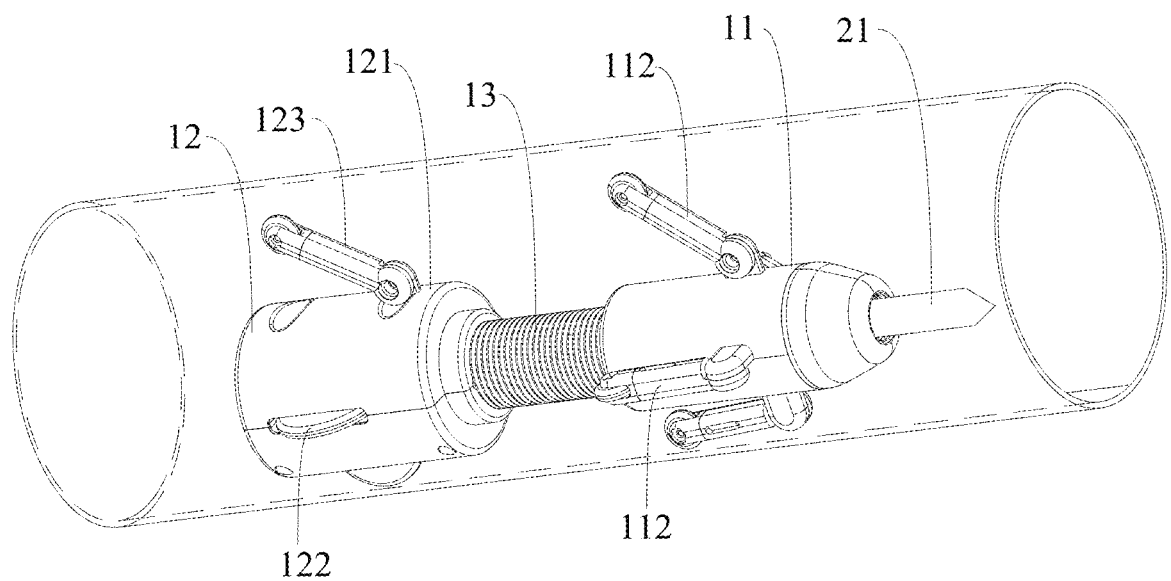
FIG. 4 is a diagram of a perspective structure of a power apparatus according to an embodiment of the present disclosure in a pipeline.

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Pipeline endoscope device (such as a pipeline robot) is an intelligent device capable of performing autonomous traveling, detection, maintenance, cleaning and other operations in the pipeline. Pipeline endoscope device includes a wheeled pipeline robot and a tracked pipeline robot. However, the wheeled pipeline robot in the related art includes a main housing and support legs, and the support legs are used for supporting the main housing and making contact with an inner wall surface of a pipeline when the wheeled pipeline robot travels in the pipeline. As the support legs are movably connected to the main housing, the wheeled pipeline robot in the related art is prone to unsteady traveling when traveling in the pipeline. Therefore, how to effectively improve the traveling stability of the wheeled pipeline robot in the pipeline has become an urgent problem to be solved.

To solve the technical problem above, please refer to FIG. 1 to FIG. 4, in a first aspect, the present disclosure provides a power apparatus 1 for a pipeline endoscope device 2, and the pipeline endoscope device 2 includes a power apparatus 1, and an endoscope assembly 21. The power apparatus 1 includes a driven module 11, a driving module 12, and an elastic connector 13. The driven module 11 includes a driven housing 111 and multiple driven support wheel sets 112, the multiple driven support wheel sets 112 are mounted on the driven housing 111, an opening angle of the driven support wheel set 112 relative to the driven housing 111 is adjustable, and the endoscope assembly 21 is mounted on the driven housing 111. The driving module 12 includes a driving housing 121, a driving wheel 122, and a driving support wheel set 123, the driving wheel 122 is mounted on the driving housing 121, the driving support wheel set 123 is mounted on the driving housing 121, and an opening angle of the driving support wheel set 123 relative to the driving housing 121 is adjustable. The elastic connector 13 located between the driven housing 111 and the driving housing 121 and connected to the driven housing 111 and the driving housing 121. When the power apparatus 1 travels in a pipeline, the driving wheel 122, the driven support wheel set 112 and the driving support wheel set 123 are configured to make contact with an inner wall surface of the pipeline.

A specific structure of the power apparatus 1 for a pipeline endoscope device is introduced in detail below with reference to FIG. 1 to FIG. 16.

As shown in FIG. 1 to FIG. 4, the power apparatus 1 includes a driven module 11, a driving module 12, and an elastic connector 13.

The driven module 11, as a crawling mechanism of the power apparatus 1, is used to cooperate with the driving module 12 to travel in the pipeline. The driven module 11 includes a driven housing 111 and a driven support wheel set 112.

The driven housing 111 serves as a housing of the driven module 11. Here, a specific material of the driven housing 111 is not limited, and designers can make reasonable choices according to actual needs. For example, the material of the driven housing 111 may be, but is not limited to, stainless steel, plastic, etc. A specific structure of the driven housing 111 is introduced in detail below.

The driven housing 111 is used for mounting the endoscope assembly 21, where the endoscope assembly 21 may be, but is not limited to, a probe, a camera, and other devices with different monitoring functions. Here, a specific mounting way between the endoscope assembly 21 and the driven housing 111 is not limited, and designers can make reasonable choices according to actual needs. For example, the endoscope assembly 21 may be detachably connected to the driven housing 111 by, but not limited to, at least one of bolting clamping or inserting. For another example, the endoscope assembly 21 may also be connected to the driven housing 111 in a non-detachable manner by, but not limited to, gluing, riveting, injection molding or 3D printing.

The driven support wheel set 112 serves as a support crawling structure of the driven module 11, and the driven support wheel set 112 is used for supporting the driven housing 111 as well as traveling in the pipeline. A specific structure about the driven support wheel set 112 is introduced in detail below.

There are multiple driven support wheel sets 112. For example, the number of the driven support wheel sets 112 may be, but not limited to, two, three, four, five, six, and more.

The driven support wheel set 112 is mounted on the driven housing 111, and an opening angle of the driven support wheel set 112 relative to the driven housing 111 is adjustable. The driven support wheel set 112 is mounted on the driven housing 111 and can rotate relative to the driven housing 111 so as to show different opening angles. Here, a specific rotatable mounting way between the driven support wheel set 112 and the driven housing 111 is not limited, and designers can make reasonable choices according to actual needs. For example, the driven support wheel set 112 may be rotatably connected to the driven housing 111 by, but not limited to, a rotating shaft, a ball joint, and other components.

When the power apparatus 1 travels in the pipeline, the driven support wheel set 112 is configured to make contact with the inner wall surface of the pipeline. It should be noted that for pipelines with different pipe diameters, a pipeline inspector can rotate the driven support wheel set 112 to different opening angles according to an actual situation, so that the driven support wheel set 112 can form effective contact with the inner wall surface of the pipeline when the power apparatus 1 travels in the pipeline, thereby ensuring traveling stability of the power apparatus 1 in the pipeline.

As shown in FIG. 1 to FIG. 4, the driving module 12, as another crawling mechanism of the power apparatus 1, is used to cooperate with the driven module 11 to travel in the pipeline. The driving module 12 includes a driving housing 121, a driving wheel 122, and a driving support wheel set 123.

The driving housing 121 is a housing of the driving module 12. Here, a specific material of the driving housing 121 is not limited, and designers can make reasonable choices according to actual needs. For example, the material of the driving housing 121 may be, but is not limited to, stainless steel, plastic, etc. A specific structure of the driving housing 121 is introduced in detail below.

The driving wheel 122, as a traveling wheel of the driving module 12, is configured to generate rolling friction with the inner wall surface of the pipeline so as to drive the power apparatus 1 to travel in the pipeline.

The number of the driving wheels 122 may be one or more (more than two).

The driving wheel 122 is mounted on the driving housing 111. Here, a specific rotatable mounting way between the driving wheel 122 and the driving housing 121 is not limited, and designers can make reasonable choices according to actual needs. For example, the driving wheel 122 may be rotatably connected to the driving housing 111 by, but not limited to, a rotating shaft.

The driving support wheel set 123 is used as a support crawling structure of the driving module 12, and the driving support wheel set 123 is used for supporting the driving housing 121 as well as traveling in the pipeline. A specific structure of the driving support wheel set 123 is introduced in detail below.

The number of the driving support wheel sets 123 may be one or more (more than two).

The driving support wheel set 123 is mounted on the driving housing 121, and an opening angle of the driving support wheel set 112 relative to the driving housing 121 is adjustable. The driving support wheel set 123 is mounted on the driving housing 121 and can rotate relative to the driving housing 121 so as to show different opening angles. Here, a specific rotatable mounting way between the driving support wheel set 123 and the driving housing 121 is not limited, and designers can make reasonable choices according to actual needs. For example, the driving support wheel set 123 may be rotatably connected to the driving housing 121 by, but not limited to, a rotating shaft, a ball joint, and other components.

When the power apparatus 1 travels in the pipeline, the driving wheel 122 and the driving support wheel set 123 are configured to make contact with the inner wall surface of the pipeline. It should be noted that for pipelines with different pipe diameters, a pipeline inspector can rotate the driving support wheel set 123 to different opening angles according to an actual situation, so that the driving support wheel set 123 can form effective contact with the inner wall surface of the pipeline when the power apparatus 1 travels in the pipeline, thereby ensuring traveling stability of the power apparatus 1 in the pipeline.

As shown in FIG. 1 to FIG. 4, the elastic connector 13 is used as a connecting mechanism of the power apparatus 1, which is configured to connect the driven module 11 and the driving module 12, so that the driven module 11 and the driving module 12 can form a whole to synchronously travel in the pipeline. A specific manifestation of the elastic connector 13 is introduced in detail below. It should be noted that the elastic connector 13 can be elastically deformed, making the power apparatus 1 suitable for traveling in a bent pipeline.

The elastic connector 13 located between the driven housing 111 and the driving housing 121 and connected to the driven housing 111 and the driving housing 121. Here, a specific mounting way between the elastic connector 13 and the driven housing 111 (driving housing 121) is not limited, and designers can make reasonable choices according to actual needs. For example, the elastic connector 13 may be detachably connected to the driven housing 111 (driving housing 121) by, but not limited to, at least one of bolting, clamping or inserting. For another example, the elastic connector 13 may also be connected to the driven housing 111 (driving housing 121) in a non-detachable manner by, but not limited to, gluing, riveting, or welding.

Based on the power apparatus 1 in an embodiment of the present disclosure, by designing the driving wheel 122 and making an opening angle of the driving wheel 122 relative to the driving housing 121 non-adjustable, when the power apparatus 1 travels in the pipeline, the driving wheel 122 may also play a role in stably supporting the driving housing 121 while making contact with the inner wall surface of the pipeline, thereby effectively ensuring traveling stability of the power apparatus 1 in the pipeline. By designing the driven support wheel set 112 and the driving support wheel set 123 and making an opening angle of the driven support wheel set 112 relative to the driven housing 111 non-adjustable, and an opening angle of the driving support wheel set 123 relative to the driving housing 121 adjustable, the driving support wheel set 112 and the driving support wheel set 123 can be adjusted to appropriate opening angles to adapt to pipelines with different pipe diameters, so that when the power apparatus 1 travels in the pipeline, the driven support wheel set 112 and the driving support wheel set 123 can make contact with the inner wall surface of the pipeline so as to cooperate with the driving wheel 122, enabling the power apparatus 1 to travel freely in the pipeline.

Figure 5:
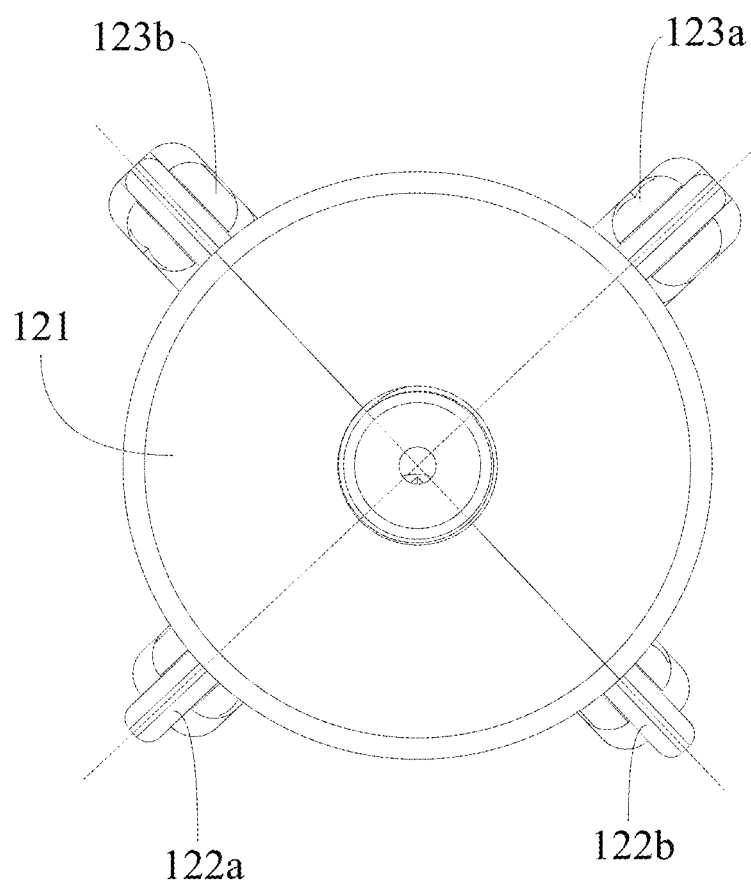
FIG. 5 is a diagram of a distribution structure of a driving wheel and a driving support wheel set according to an embodiment of the present disclosure on a driving housing.

As shown in FIG. 5, there are multiple driving wheels 122. The multiple driving wheels 122 include a first driving wheel 122*a* and a second driving wheel 122*b*. There are multiple driving support wheel sets 123, and the multiple driving support wheel sets 123 include a first driving support wheel set 123*a* and a second driving support wheel set 123*b*. The first driving wheel 122*a* and the second-first driving support wheel set 123*a* are arranged along a first diagonal line, the second driving wheel 122*b* and the second driving support wheel set 123*b* are arranged along a second diagonal line, and the first diagonal line intersects with the second diagonal line. In this way, the first driving wheel 122*a* and the second driving wheel 122*b* are adjacent to each other, so that when the power apparatus 1 travels in the pipeline, the first driving wheel 122*a* and the second driving wheel 122*b* can also make contact with the inner wall surface of the pipeline to ensure traveling stability of the power apparatus 1 in the pipeline.

Specific arrangement ways of the first driving wheel 122*a*, the second driving wheel 122*b*, the first driving support wheel set 123*a* and the second driving support wheel set 123*b* on the driving housing 121 may be, but are not limited to, one or more of the following situations.

In a first situation, the first diagonal line is perpendicular to the second diagonal line. In this way, a connecting line between a rotation center of the first driving wheel 122*a* and the intersection point of two diagonal lines is a first connecting line, a connecting line between a rotation center of the second driving wheel 22b and the intersection point of the two diagonal lines is a second connecting line, a connecting line between a rotation center of the first driving support wheel set 123a and the intersection point of the two diagonal lines is a third connecting line, and a connecting line between a rotation center of the second driving support wheel set 123b and the intersection point of the two diagonal lines is a fourth connecting line. In addition, an included angle between the first connecting line and the second connecting line is 90 degrees, an included angle between the second connecting line and the third connecting line is 90 degrees, an included angle between the third connecting line and the fourth connecting line is 90 degrees, and an included angle between the fourth connecting line and the first connecting line is 90 degrees. Through such a design, when the power apparatus 1 travels in the pipeline, contact positions between the first driving wheel 122a, the second driving wheel 122b, the first driving support wheel set 123a and the second driving support wheel set 123b and the inner wall surface of the pipeline are relatively uniform, thereby ensuring traveling stability of the power apparatus 1 in the pipeline.

In a second situation, the first diagonal line and the second diagonal line intersect to form an intersection point, and the intersection point is a midpoint of the first diagonal line and the second diagonal line. In this way, a connecting line between a rotation center of the first driving wheel 122a and the intersection point of two diagonal lines is a first connecting line, a connecting line between a rotation center of the second driving wheel 22b and the intersection point of the two diagonal lines is a second connecting line, a connecting line between a rotation center of the first driving support wheel set 123a and the intersection point of the two diagonal lines is a third connecting line, and a connecting line between a rotation center of the second driving support wheel set 123b and the intersection point of the two diagonal lines is a fourth connecting line. In addition, a length of the first connecting line is equal to that of the third connecting line, and a length of the second connecting line is equal to that of the fourth connecting line. Through such a design, when the power apparatus 1 travels in the pipeline, contact positions between the first driving wheel 122a, the second driving wheel 122b, the first driving support wheel set 123a and the second driving support wheel set 123b and the inner wall surface of the pipeline are relatively uniform, thereby further ensuring traveling stability of the power apparatus 1 in the pipeline.

In a third situation, a cross-section of the first driving wheel 112a on a plane perpendicular to its rotation axis is parallel to or coincident with a plane where the first diagonal line is located. Through such a design, the first driving wheel 122a not only can travel stably in the pipeline, but also can reduce stress on the first driving wheel 122a so as to reduce abrasion of the first driving wheel 122a.

In a fourth situation, a cross-section of the second driving wheel 122b on a plane perpendicular to its rotation axis is parallel to or coincident with a plane where the second diagonal line is located. Through such a design, the second driving wheel 122b not only can travel stably in the pipeline, but also can reduce stress on the second driving wheel 122b so as to reduce abrasion of the second driving wheel 122b.

As shown in FIG. 6 to FIG. 9, the driving support wheel set 123 is used as a support crawling structure of the driving module 12, and the driving support wheel set 123 includes a first support leg 1231 and a first driven wheel 1232. The first support leg 1231 includes a first support section 1231a, a second support section 1231b, and a first elastic member 1231c. The first support section 1231a is rotatably connected to the driving housing 121, the second support section 1231b forms an inner-outer nested telescopic structure with the first support section 1231a, the first elastic member 1231c is located in a telescopic space enclosed by the second support section 1231b and the first support section 1231a, and the first elastic member 1231c abuts against the second support section 1231b and the first support section 1231a. The first driven wheel 1232 is fixedly connected to the second support section 1231b. When the power apparatus 1 travels in the pipeline, the first driven wheel 1232 is configured to make contact with the inner wall surface of the pipeline.

The first support section 1231a forms an inner-outer nested telescopic structure with the second support section 1231b, which may be as follows: the first support section 1231a is cylindrical, and the second support section 1231b is stored in a cylindrical cavity of the first support section 1231a to form a telescopic rod structure with the first support section 1231a, or the second support section 1231b is cylindrical, and the first support section 1231a is stored in a cylindrical cavity of the second support section 1231b to form a telescopic rod structure with the second support section 1231b.

The first elastic member 1231c may be a spring, or an elastic sheet. The first elastic member 1231c abuts against the second support section 1231b and the first support section 1231a, the second support section 1231b and the first support section 1231a are in an extended state away from each other under the action of an elastic force of the first elastic member 1231c. The second support section 1231b presses the first elastic member 1231c under the action of the inner wall surface of the pipeline, so that the first elastic member 1231c is further compressed, and the second support section 1231b performs contraction movement relative to the first support section 1231a, enabling the first driven wheel 1232 to be in contact with the inner wall surface of the pipeline. It should be noted that for pipelines with different pipe diameters, the first elastic member 1231c is able to generate different compression amounts under the action of the inner wall surfaces of pipelines with different diameters, so that the contraction amount of the second support section 1231b relative to the first support section 1231a is also different. In addition, it may be understood that the smaller the pipe diameter, the greater the degree of compression of the first elastic member 1231c, and thus the greater the contraction amount of the second support section 1231b that extends and retracts relative to the first support section 1231a (that is, the shorter a total length of the first support leg 1231).

By designing the first support section 1231a, the second support section 1231b, the first elastic member 1231c and the first driven wheel 1232, the total length of the first support leg 1231 can be adjusted, so that the first driven wheel 1232 connected to the second support section 1231b can be in contact with the inner wall surfaces of the pipelines with different pipe diameters to enhance adaptability of the power apparatus 1. The first elastic member 1231c always abuts against a position between the second support section 1231b and the first support section 1231a, so that the second support section 1231b, under the action of an elastic force of the first elastic member 1231c, can drive the first driven wheel 1232 connected thereto to always abut against the inner wall surface of the pipeline to effectively ensure stability of the power apparatus 1 when traveling in the pipeline.

As shown in FIG. 6 to FIG. 9 and FIG. 16, the driving housing 121 includes a first housing 1211 connected to the elastic connector 13, and a first connecting portion 1212 arranged on the first housing 1211. The first connecting portion 1212 is provided with one of multiple first teeth 1231a3 and multiple first slots 1213 arranged around a rotational axis of the first support section 1231a. The first support section 1231a includes a first support rod 1231a1, and a second connecting portion 1231a2 arranged on the first support rod 1231a1. The second connecting portion 1231a2 is rotatably connected to the first connecting portion 1212, the second connecting portion 1231a2 is provided with the other of the multiple first teeth 1231a3 and the multiple first slots 1213 arranged around a rotational axis, and the multiple first teeth 1231a3 are engaged with the multiple first slots 1213 in a one-to-one correspondence.

The first connecting portion 1212 may be detachably connected to the first housing 1211 by, but not limited to, at least one of bolting, clamping or inserting, or the first connecting portion 1212 may also be connected to the first housing 111 in a non-detachable manner by, but not limited to, gluing, injection molding or 3D printing. The second connecting portion 1231a2 may be detachably connected to the first support rod 1231a1 by, but not limited to, at least one of bolting, clamping or inserting, or the second connecting portion 1231a2 may also be connected to the first support rod 1231a1 in a non-detachable manner by, but not limited to, gluing, injection molding or 3D printing. The second connecting portion 1231a2 may be rotatably connected to the first connecting portion 1212 by, but not limited to, a rotating shaft.

Before the power apparatus 1 travels in the pipeline, an inspector can rotate the first support rod 1231a1 to a suitable angle, so that the first driven wheel 1232 connected to the second support section 1231b can be in contact with the inner wall surface of the pipeline, and by engaging the multiple first teeth 1231a3 with the first slots in a one-to-one correspondence, a position between the first support rod 1231a1 and the first housing 1211 is secured relatively.

As shown in FIG. 6 to FIG. 9, the driven support wheel set 112 is used as a support crawling structure of the driven module 11, and the driven support wheel set 112 includes a second support leg 1121, and a second driven wheel 1122. The second support leg 1121 includes a third support section 1121a, a fourth support section 1121b, and a second elastic member 1121c. The third support section 1121a is rotatably connected to the driven housing 111, the fourth support section 1121b forms an inner-outer nested telescopic structure with the third support section 1121a, the second elastic member 1121c is located in a telescopic space enclosed by the fourth support section 1121b and the third support section 1121a, and the second elastic member 1121c abuts against the fourth support section 1121b and the third support section 1121a. The second driven wheel 1122 is fixedly connected to the fourth support section 1121b. When the power apparatus 1 travels in the pipeline, the second driven wheel 1122 is configured to make contact with the inner wall surface of the pipeline.

The third support section 1121a forms an inner-outer nested telescopic structure with the fourth support section 1121b, which may be as follows: the third support section 1121a is cylindrical, and the fourth support section 1121b is stored in a cylindrical cavity of the third support section 1121a to form a telescopic rod structure with the third support section 1121a, or the fourth support section 1121b is cylindrical, and the third support section 1121a is stored in a cylindrical cavity of the fourth support section 1231b to form a telescopic rod structure with the fourth support section 1121b.

The second elastic member 1121c may be a spring, or an elastic sheet. The second elastic member 1121c abuts against the fourth support section 1121b and the third support section 1121a, the fourth support section 1121b and the third support section 1121a are in an extended state away from each other under the action of an elastic force of the second elastic member 1121c. The fourth support section 1121b presses the second elastic member 1121c under the action of the inner wall surface of the pipeline, so that the second elastic member 1121c is further compressed, and the fourth support section 1121b performs contraction movement relative to the third support section 1121a, enabling the second driven wheel 1122 to be in contact with the inner wall surface of the pipeline. It should be noted that for pipelines with different pipe diameters, the second elastic member 1121c is able to generate different compression amounts under the action of inner wall surfaces of pipelines with different diameters, so that the contraction amount of the fourth support section 1121b relative to the third support section 1121a is also different. In addition, it may be understood that the smaller the pipe diameter, the greater the degree of compression of the second elastic member 1121c, and the greater the contraction amount of the fourth support section 1121b that extends and retracts relative to the third support section 1121a (that is, the shorter a total length of the second support leg 1121).

By designing the third support section 1121a, the fourth support section 1121b, the second elastic member 1121c and the second driven wheel 1122, the total length of the second support leg 1121 can be adjusted, so that the second driven wheel 1122 connected to the fourth support section 1121b can be in contact with inner wall surfaces of the pipelines with different pipe diameters to enhance adaptability of the power apparatus 1. The second elastic member 1121c always abuts against a position between the fourth support section 1121b and the third support section 1121a, so that the fourth support section 1121b, under the action of the elastic force of the second elastic member 1121c, can drive the second driven wheel 1122 connected thereto to always abut against the inner wall surface of the pipeline to effectively ensure stability of the power apparatus 1 when traveling in the pipeline.

As shown in FIG. 6 to FIG. 9 and FIG. 16, the driven housing 111 includes a second housing 1111 connected to the elastic connector 13, and a third connecting portion 1112 arranged on the second housing 1111. The third connecting portion 1112 is provided with one of multiple second teeth 1121a3 and multiple second slots 1113 arranged around a rotational axis of the third support section 1121a. The third support section 1121a includes a second support rod 1121a1, and a fourth connecting portion 1121a2 arranged on the second support rod 1121a1. The fourth connecting portion 1121a2 is rotatably connected to the third connecting portion 1112, the fourth connecting portion 1121a2 is provided with the other of the multiple second teeth 1121a3 and the multiple second slots 1113 arranged around a rotational axis, and the multiple second teeth 1121a3 are engaged with the multiple second slots 1113 in a one-to-one correspondence.

The third connecting portion 1112 may be detachably connected to the second housing 1111 by, but not limited to, at least one of bolting, clamping or inserting, or the third connecting portion 1112 may also be connected to the second housing 111 in a non-detachable manner by, but not limited to, gluing, injection molding or 3D printing. The fourth connecting portion 1121a2 may be detachably connected to the second support rod 1121a1 by, but not limited to, at least one of bolting, clamping or inserting, or the fourth connecting portion 1121a2 may also be connected to the second support rod 1121a1 in a non-detachable manner by, but not limited to, gluing, injection molding or 3D printing. The fourth connecting portion 1121a2 may be rotatably connected to the third connecting portion 1112 by, but not limited to, a rotating shaft.

Before the power apparatus 1 travels in the pipeline, an inspector can rotate the second support rod 1121a1 to a suitable angle, so that the second driven wheel 1122 connected to the fourth support section 1121b can be in contact with the inner wall surface of the pipeline. In addition, by engaging the multiple second teeth 1121a3 with the corresponding second slots in a one-to-one correspondence, a position between the second support rod 1121a1 and the second housing 1111 is relatively secured.

Figure 6:
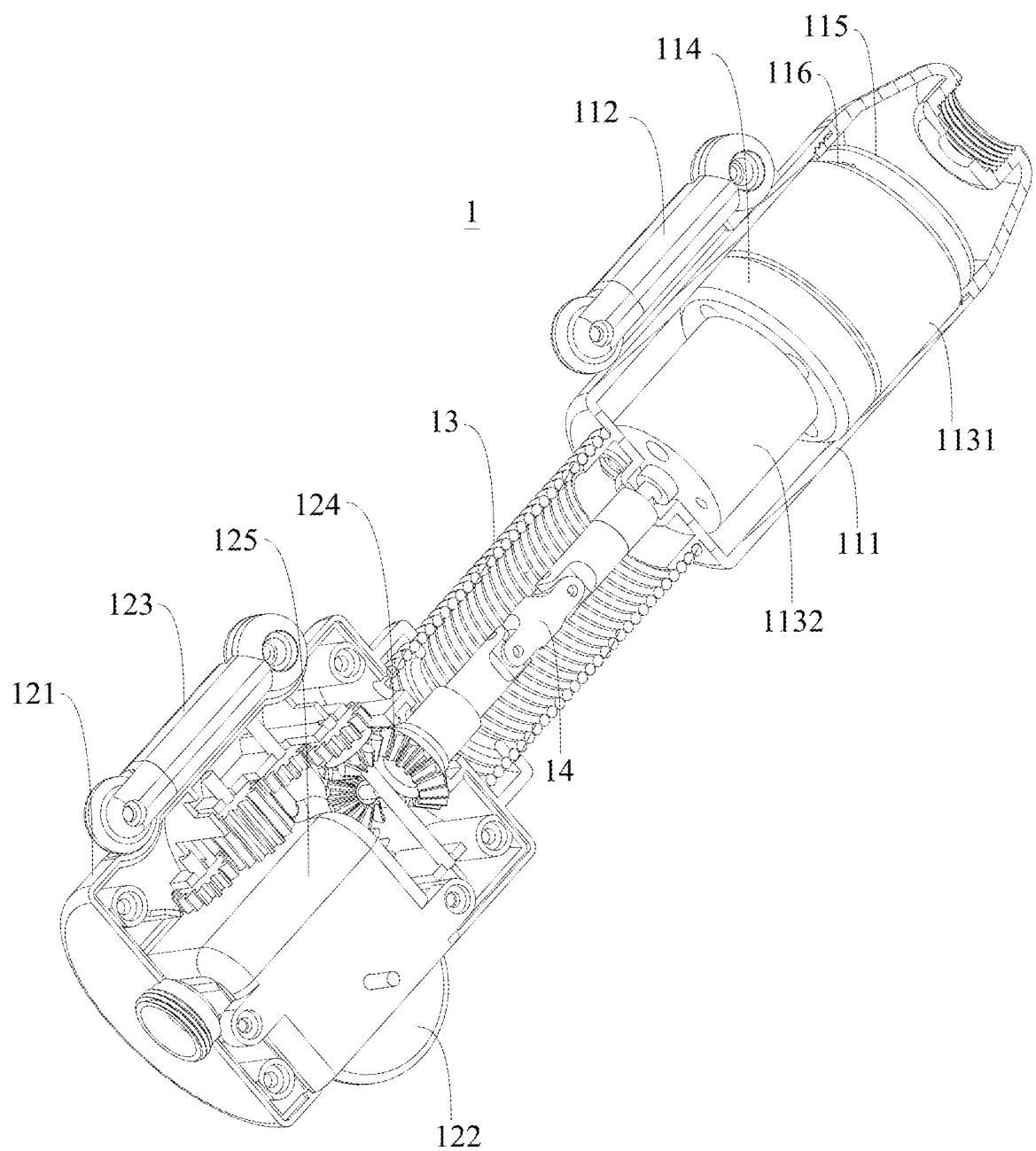
FIG. 6 is a diagram of a partial sectional structure of a power apparatus according to an embodiment of the present disclosure.
Figure 7:
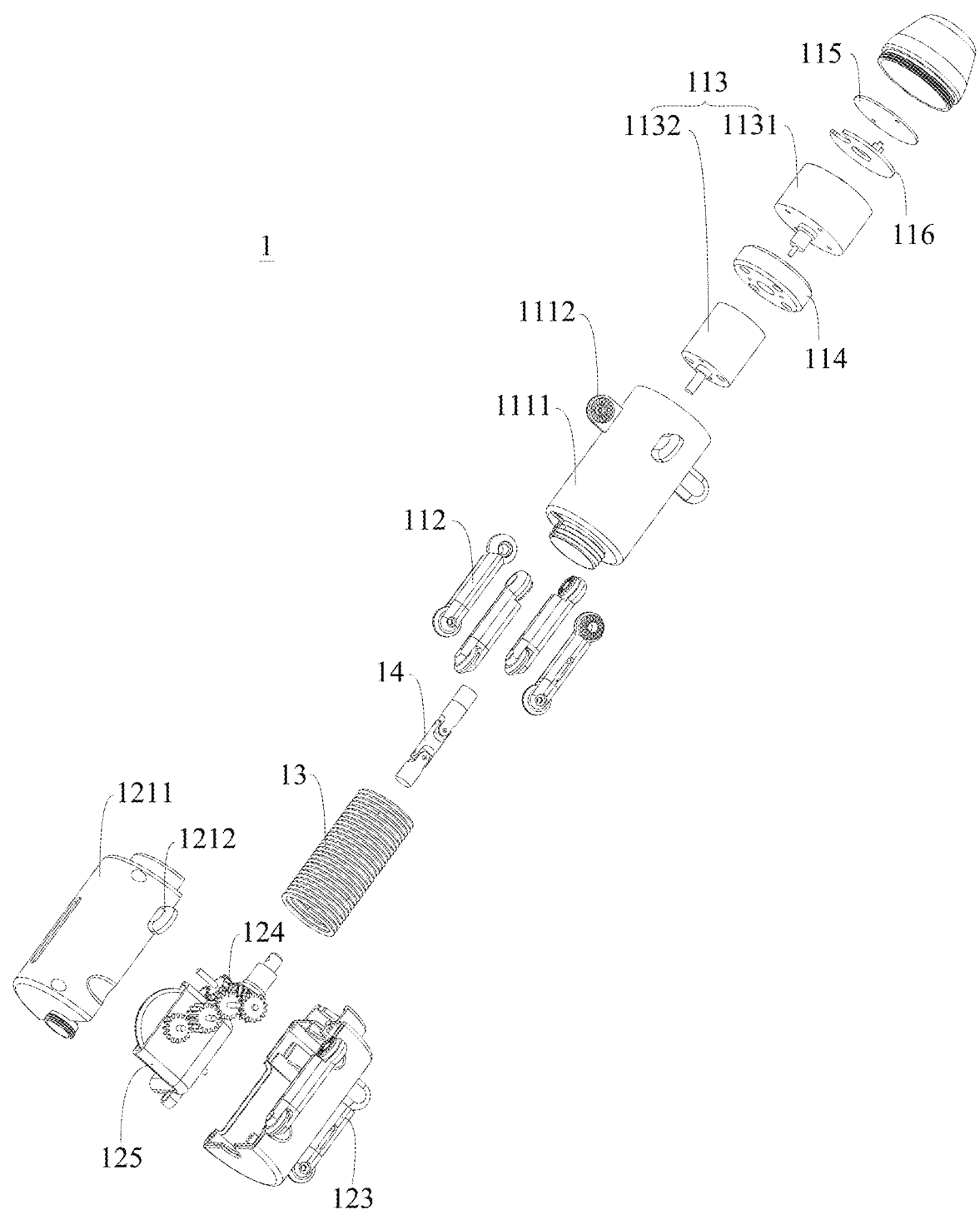
FIG. 7 is a diagram of an exploded structure of a power apparatus according to an embodiment of the present disclosure.
Figure 8:
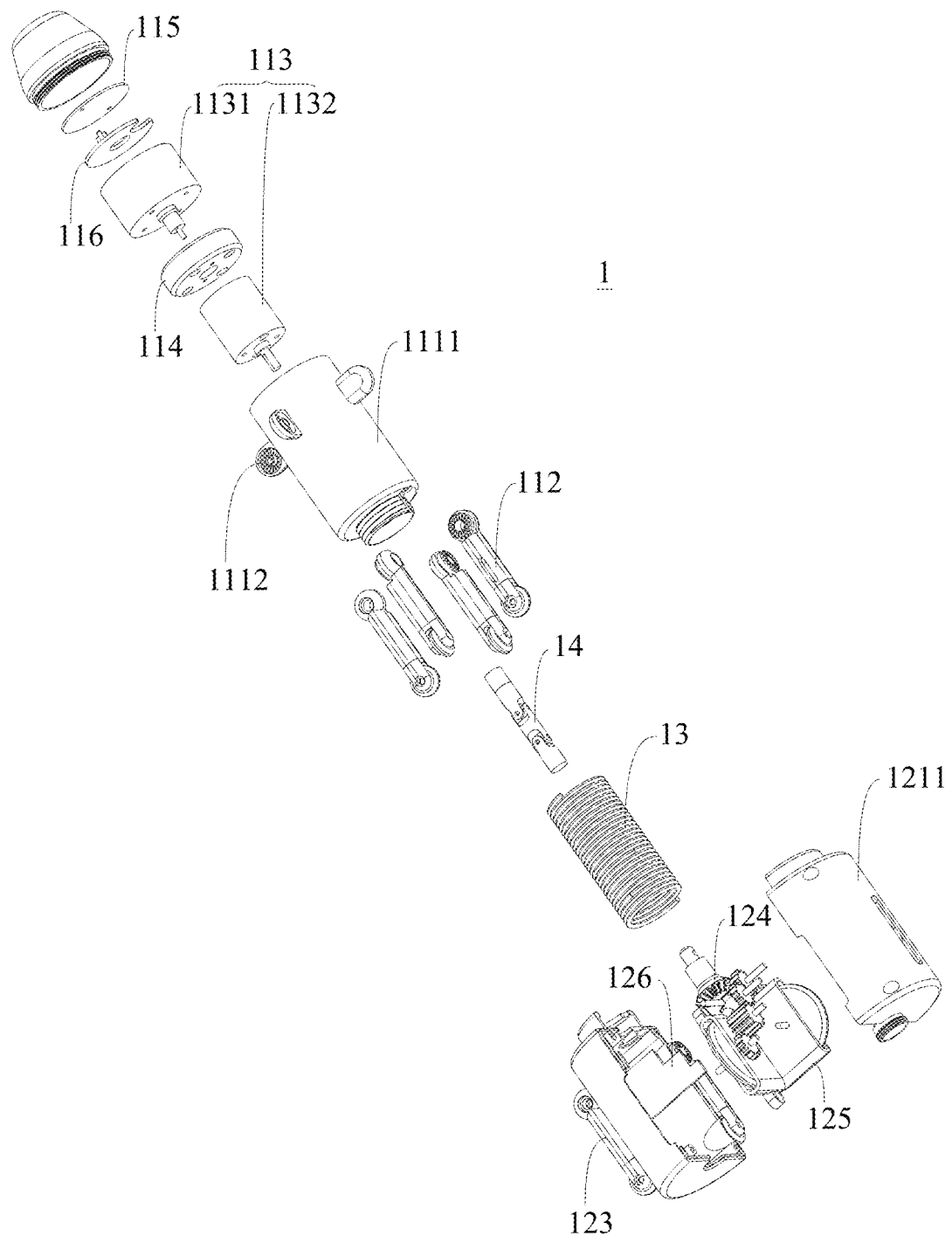
FIG. 8 is a diagram of an exploded structure of the power apparatus in FIG. 7 from another perspective.
Figure 9:
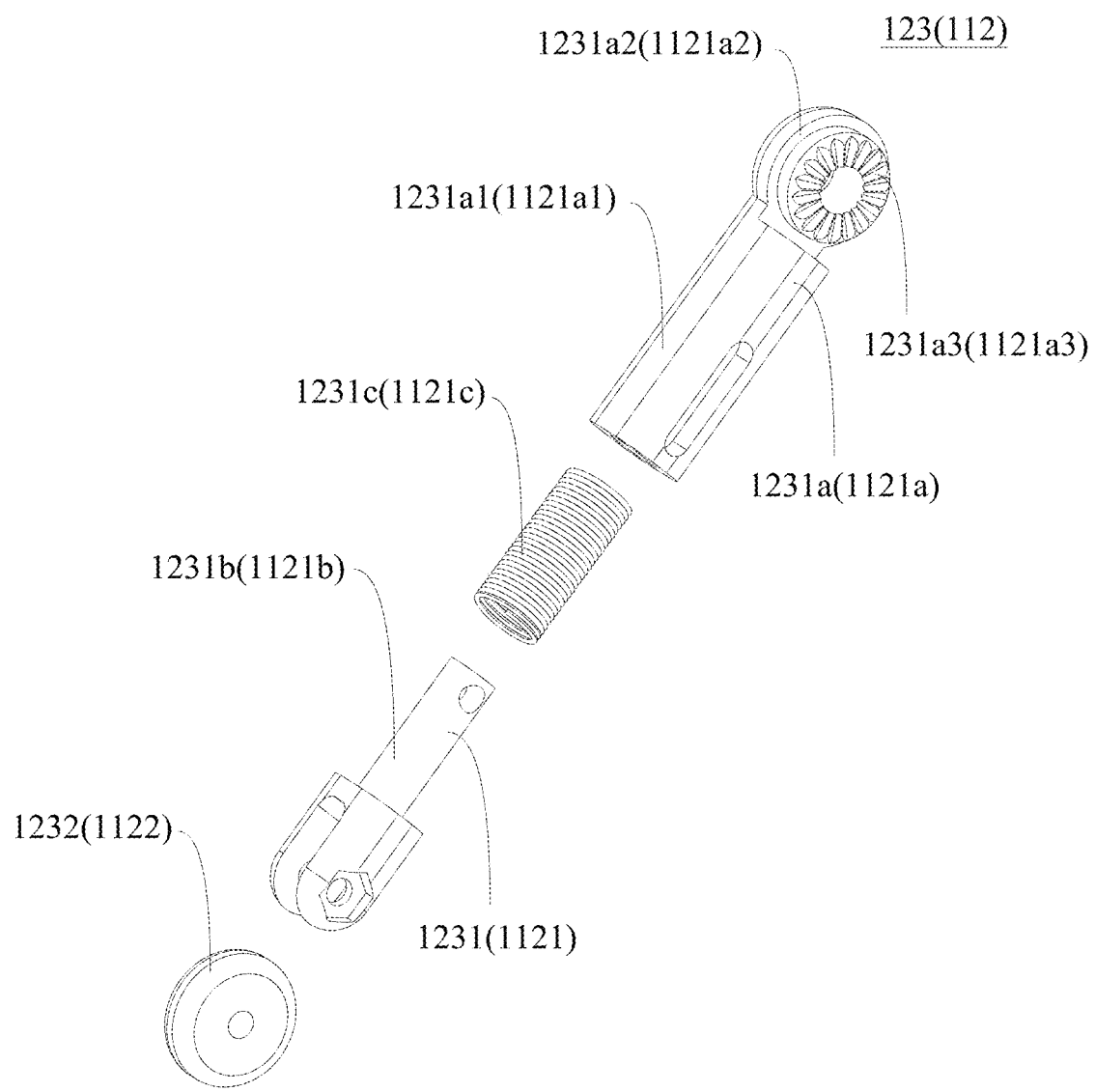
FIG. 9 is a diagram of a breakdown structure of a driving support wheel set (driven support wheel set) according to an embodiment of the present disclosure.
Figure 10:
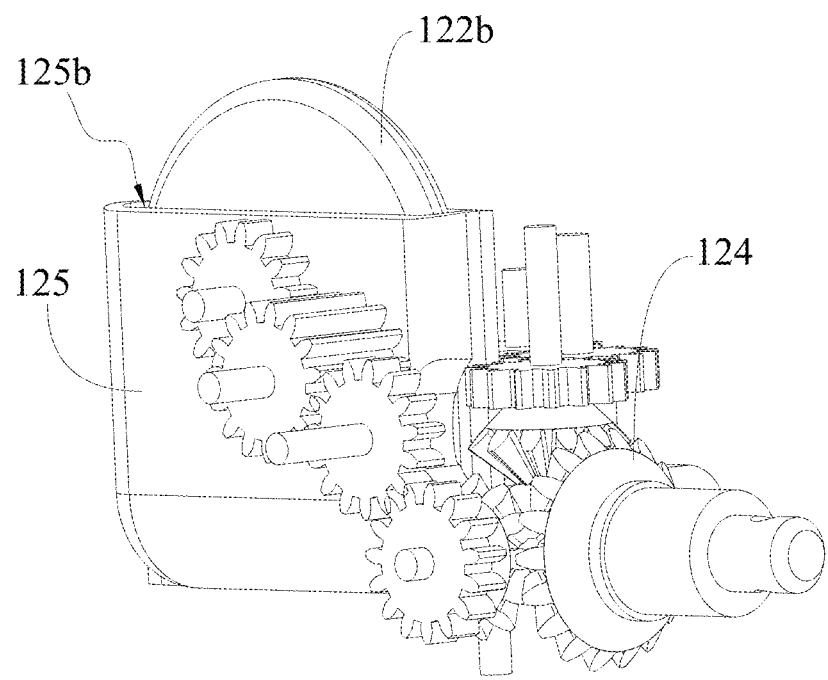
FIG. 10 is a structural diagram of a transmission unit as well as a driving wheel mounted on a mounting plate according to an embodiment of the present disclosure.
Figure 11:
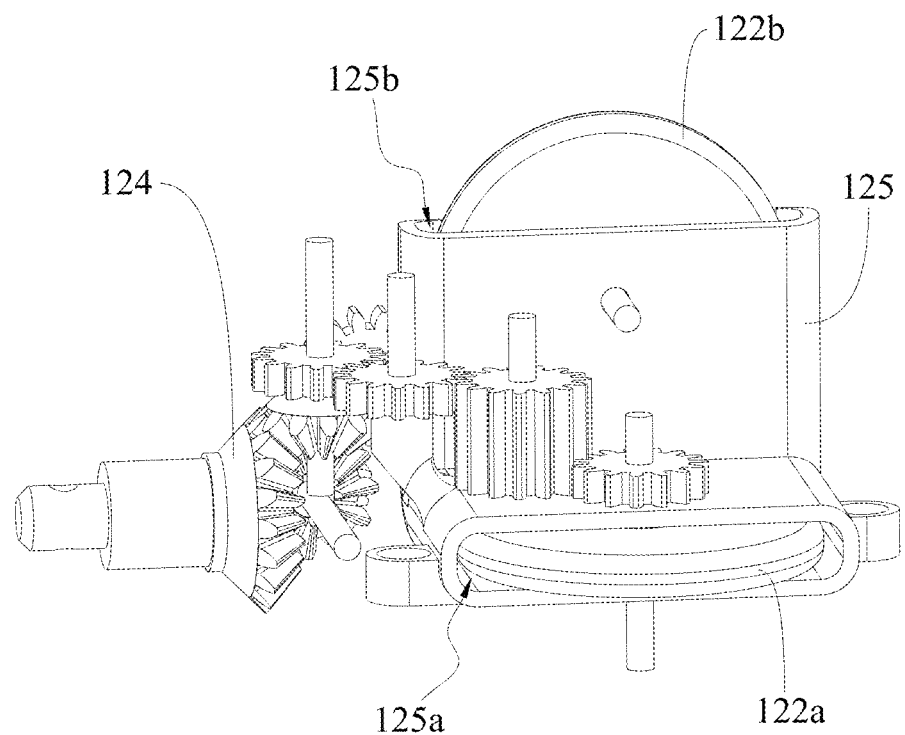
FIG. 11 is a structural diagram of FIG. 10 from another perspective.
Figure 12:
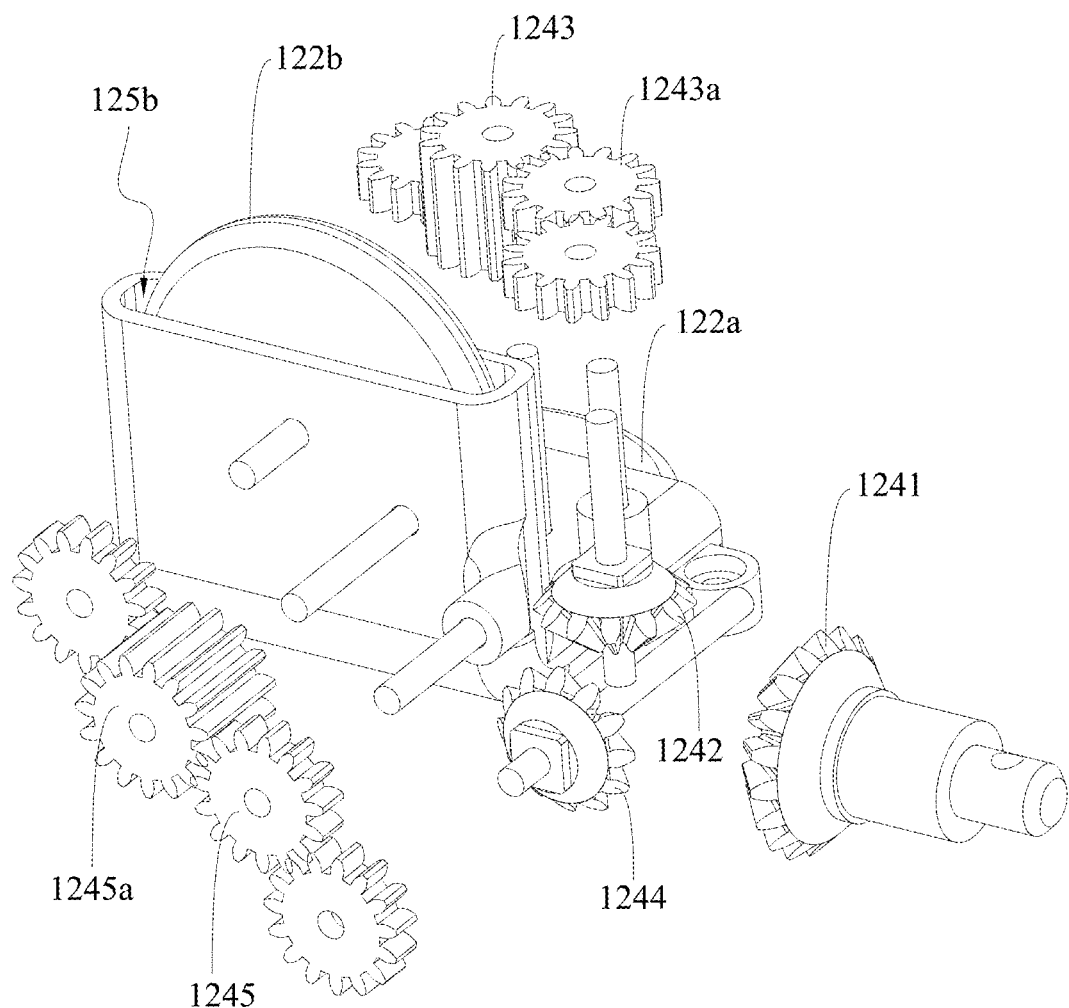
FIG. 12 is a diagram of a partial breakdown structure of FIG. 10.
Figure 13:
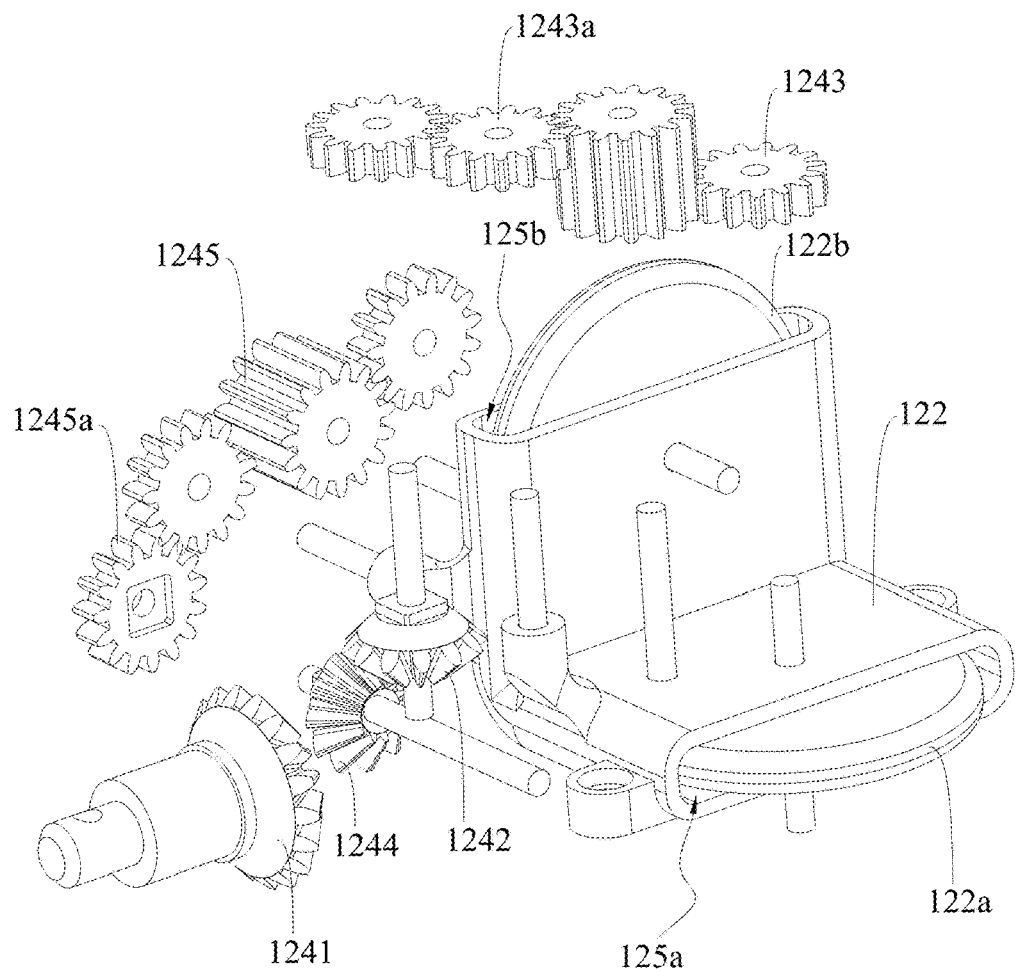
FIG. 13 is a diagram of the breakdown structure of FIG. 12 from another perspective.
Figure 14:
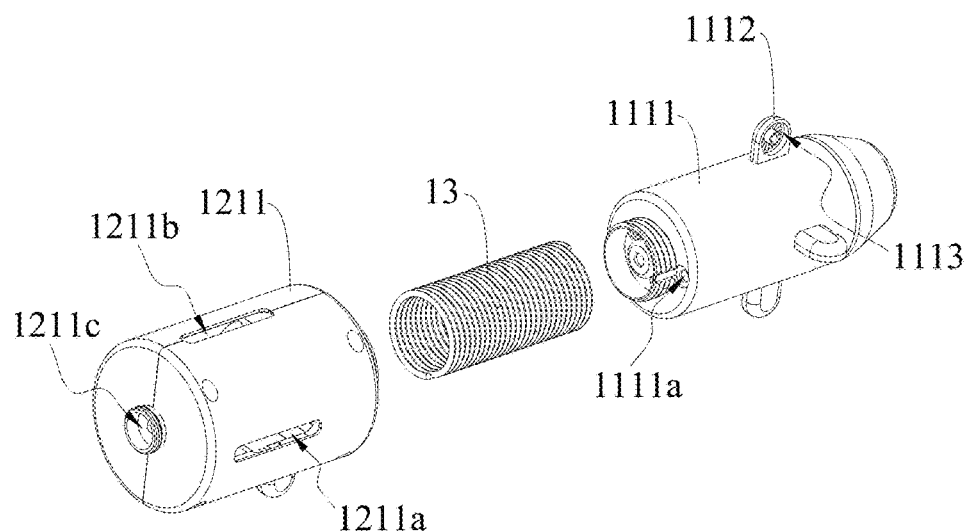
FIG. 14 is a structural diagram of a driving housing, an elastic connector and a driven housing according to an embodiment of the present disclosure.
Figure 15:
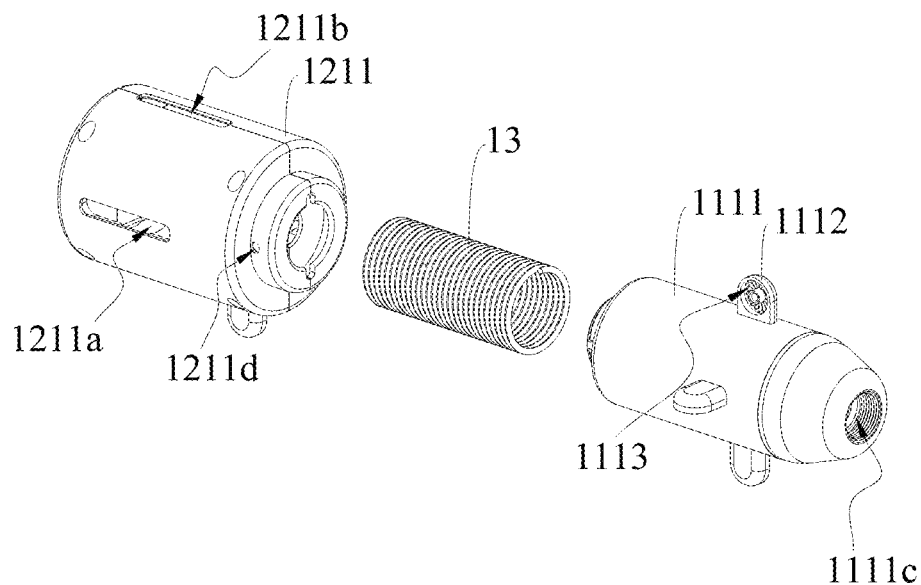
FIG. 15 is a structural diagram of FIG. 14 from another perspective.

As shown in FIG. 6 to FIG. 8, the driven module 11 further includes a power source 113, and the power source 113 is arranged in the driven housing 111. The driving module 12 further includes a transmission unit 124, the transmission unit 124 is arranged in the driving housing 121, and is in transmission connection with the first driving wheel 122a and the second driving wheel 122b. The elastic connector 13 is of a cylindrical structure, the power apparatus 1 further includes a universal connecting rod 14 located in a cylindrical cavity of the elastic connector 13, a first end of the universal connecting rod 14 is connected to a drive end of the power source 113, and a second end of the universal connecting rod 14 is connected to the transmission unit 124. The power source 113 is configured to transmit a drive force to the transmission unit 124 through the universal connecting rod 14, enabling the transmission unit 124 to drive the first driving wheel 122a and the second driving wheel 122b to rotate.

The power source 113 is configured to generate a drive force, a specific manifestation of the power source 113 is introduced below, and a specific mounting way between the power source 113 and the driven housing 111 (specifically the second housing 1111 described above) will be introduced in detail below.

The transmission unit 124 is configured to transmit the drive force, which may be, but is not limited to, a multi-link mechanism, a gear chain mechanism and other structural members capable of transmitting the drive force. A specific manifestation of the transmission unit 124 is introduced in detail below, and a specific mounting way between the transmission unit 124 and the driving housing 121 (specifically, the first housing 1211 described above) is introduced in detail below.

The universal connecting rod 14 is configured to transmit the drive force generated by the power source 113 to the transmission unit 124 on one hand, and cooperate with the elastic connector 13 to achieve steering on the other hand, thereby enabling the power apparatus 1 to travel in a bent pipeline. By designing the elastic connector 13 into a cylindrical structure, the universal connecting rod 14 is accommodated in the cylindrical cavity of the elastic connector 13, so that the universal connecting rod 14 can make rational use of an internal space of the elastic connector 13, which can effectively reduce the overall volume of the power apparatus 1. In addition, the elastic connector 13 can protect the universal connecting rod 14 to effectively prevent impurities in the pipeline from winding on the universal connecting rod 14, thereby ensuring the effective transmission of drive force.

By designing the power source 113, the universal connecting rod 14 and the transmission unit 124, the power source 113 is configured to generate the drive force, the universal connecting rod 14 is configured to transmit the drive force generated by the power source 113 to the transmission unit 124, the transmission unit 124, under the action of the drive force, is configured to drive the first driving wheel 122a and the second driving wheel 122b in transmission connection with the transmission unit 124 to rotate to generate rolling friction between the first driving wheel 122a and the second driving wheel 122b and the inner wall surface of the pipeline, thereby ensuring effective traveling of the power apparatus 1 in the pipeline.

Specifically, as shown in FIG. 10 to FIG. 13, the transmission unit 124 includes a driving bevel gear 1241, a first driven bevel gear 1242 and a first gear set 1243 mounted in the driving housing 121. The driving bevel gear 1241 is connected to the second end of the universal connecting rod 14, the first driven bevel gear 1242 is meshed with the driving bevel gear 1241, and the first gear set 1243 includes at least two first sub-gears 1243a meshed with each other. One of the first sub-gears 1243a in the first gear set 1243 is coaxially and fixedly connected to the first driven bevel gear 1242, and the other of the first sub-gears 1243a in the first gear set 1243 is fixedly connected to an axle of the first driving wheel 122a. The drive force generated by the power source 113 is transmitted to the driving bevel gear 1241 through the universal connecting rod 14, the driving bevel gear 1241 rotates to drive the first driven bevel gear 1242 meshed thereto to rotate, the first driven bevel gear 1242 rotates to drive the first sub-gear 1243a coaxially and fixedly connected thereto to rotate, the first sub-gear 1243a rotates to drive all first sub-gears 1243a in the first gear set 1243 to rotate synchronously. The other first sub-gear 1243a in the first gear set 1243 rotates to drive the first driving wheel 122a coaxially and fixedly connected thereto to rotate, the first driving wheel 122a rotates to generate rolling friction with the inner wall surface of the pipeline, thereby ensuring effective traveling of the power apparatus 1 in the pipeline.

The transmission unit 124 further includes a second driven bevel gear 1244 and a second gear set 1245 mounted in the driving housing 121, the second driven bevel gear 1244 is meshed with the driving bevel gear 1241, and the second gear set 1245 include at least two second sub-gears meshed 1245a with each other. One of the second sub-gears 1245a in the second gear set 1245 is coaxially and fixedly connected to the second driven bevel gear 1244, and the other of the second sub-gears 1245a in the second gear set 1245 is fixedly connected to an axle of the second driving wheel 122b. The drive force generated by the power source 113 is transmitted to the driving bevel gear 1241 through the universal connecting rod 14, the driving bevel gear 1241 rotates to drive the second driven bevel gear 1244 meshed thereto to rotate, the second driven bevel gear 1244 rotates to drive one of the second sub-gears 1245a coaxially and fixedly connected thereto to rotate, the second sub-gear 1245a rotates to drive all second sub-gears 1245a in the second gear set 1245 to rotate synchronously. The other second sub-gear 1245a in the second gear set 1245 rotates to drive the second driving wheel 122b coaxially and fixedly connected thereto to rotate, and the second driving wheel 122b rotates to generate rolling friction with the inner wall surface of the pipeline, thereby ensuring effective traveling of the power apparatus 1 in the pipeline. The first driven bevel gear 1242 and the second driven bevel gear 1244 are meshed with a same driving bevel gear 1241 to achieve synchronous rotation of the first driving wheel 122a and the second driving wheel 122b. It should be noted that by designing the transmission unit 124 as the driving bevel gear 1241, the first driven bevel gear 1242, the second driven bevel gear 1244, the first gear set 1243 and the second gear set 1245, the driving bevel gear 1241, the first driven bevel gear 1242, the second driven bevel gear 1244, the first gear set 1243 and the second gear set 1245 are more compact in spatial arrangement. This helps effectively reduce the overall volume of the power apparatus 1.

As shown in FIG. 10 to FIG. 15, the driving module 12 further includes a mounting plate 125 arranged in the driving housing 121, the transmission unit 124 is mounted on the mounting plate 125, the inside of the mounting plate 125 is hollow to form a first accommodation cavity 125a and a second accommodation cavity 125b, the driving housing 121 is provided with a first opening 1211a corresponding to a cavity opening of the first accommodation cavity 125a, and a second opening 1211b corresponding to a cavity opening of the second accommodation cavity 125b. The first driving wheel 122a passes through the first opening 1211a and partially extends into the first accommodation cavity 125a, and the first driving wheel 122a is rotatably connected to the mounting plate 125. The second driving wheel 122b passes through the second opening 1211b and partially extends into the second accommodation cavity 125b, and the second driving wheel 122b is rotatably connected to the mounting plate 125.

Here, a specific mounting way between the mounting plate 125 and the driving housing 121 is not limited, and designers can make reasonable choices according to actual needs. For example, the mounting plate 125 may be detachably connected to the driving housing 121 (specifically, the first housing 1211 described above) by, but not limited to, at least one of bolting, clamping, or inserting. For another example, the mounting 125 may also be connected to the driving housing 121 (specifically, the first housing 1211 described above) in a non-detachable manner by, but not limited to, riveting, gluing, injection molding or 3D printing.

The first driving wheel 122a and the second driving wheel 22b are mounted on the driving housing 121 through the mounting plate 125. By processing and forming the first accommodation cavity 125a and the second accommodation cavity 125b in the mounting plate 125, the first driving wheel 122a can reasonably use an internal space of the mounting plate 125 (i.e., the first accommodation cavity 125a), and the second driving wheel 122b can reasonably use the internal space of the mounting plate 125 (i.e. the second accommodation cavity 125b). Therefore, the first driving wheel 122a, the second driving wheel 122b and the mounting plate 125 are more compact in spatial arrangement, so as to effectively reduce the overall volume of the power apparatus 1. In addition, the mounting plate 125 may also be used as a bracket 114 of the transmission unit 124 for mounting the transmission unit 124, making the transmission unit 124 and the mounting plate 125 more compact in spatial arrangement, so as to effectively reduce the overall volume of the power apparatus 1.

It should be noted that due to detail design of the transmission unit 124 and the mounting plate 125, miniaturized design of the power apparatus 1 in the present disclosure can be achieved. Moreover, the power apparatus 1 in the present disclosure is suitable for traveling in a pipeline with a radial dimension greater than or equal to 10 cm and smaller than or equal to 15 cm. For example, the power apparatus 1 is suitable for traveling in a pipeline with a radial dimension of 10 cm, 11 cm, 12 cm, 13 cm, 14 cm, or 15 cm. In addition, it may be understood that because the overall volume of the power apparatus 1 in the present disclosure is small, the power apparatus 1 may be used in, but is not limited to, an application scenario such as the detection of a domestic drainage pipeline.

As shown in FIG. 6 to FIG. 8, the driven module 11 further includes a bracket 114 arranged in the driven housing 111, the power source 113 includes a motor 1131 and a speed reducer 1132, the motor 1131 and the speed reducer 1132 are respectively arranged on both sides of the bracket 114 in a traveling direction of the power apparatus 1, the motor 1131 is mounted on the bracket 114, a motor 1131 shaft of the motor 1131 is connected to the speed reducer 1132, and a rotating shaft of the speed reducer 1132 is connected to the first end of the universal connecting rod 14 as the drive end.

The bracket 114 may be detachably connected to the driven housing 111 (specifically the second housing 1111 described above) by, but not limited to, at least one of bolting, clamping or inserting, or the bracket 114 may also be connected to the driven housing 111 (specifically the second housing 1111 described above) in a non-detachable manner by, but not limited to, gluing, injection molding or 3D printing. The motor 1131 may be fixedly connected to the bracket 114 by, but not limited to, locking a screw.

By designing the motor 1131 and the speed reducer 1132, the motor 1131 shaft of the motor 1131 rotates to drive a rotating shaft of the speed reducer 1132, the rotating shaft of the speed reducer 1132 rotates to drive the connected universal connecting rod 14 to rotate, thereby effectively transmitting a drive force generated by the motor 1131 to the transmission unit 124 through the universal connecting rod 14.

As shown in FIG. 6, FIG. 14 to FIG. 16, the driving housing 121 is provided with a wiring port 1211c and a first wire through hole 1211d. The wiring port 1211c is formed in one end, away from the elastic connector 13, of the driving housing 121, and the first wire through hole 1211d is formed in one end, close to the elastic connector 13, of the driving housing 121. The driven housing 111 is provided with a second wire through hole 1111a which is formed in one end, close to the elastic connector 13, of the driven housing 111. The driven module 11 further includes an electric control assembly 115, and the electric control assembly 115 is arranged in the driven housing 111. The power apparatus 1 further includes a wire harness 15 (as shown by a dotted line in FIG. 16), the wire harness 15 includes a first wire segment, a second wire segment and a third wire segment. The first wire segment is arranged in the driving housing 121 and electrically connected to the wiring port 1211c. The second wire segment is arranged in the driven housing 111 and electrically connected to the electronic control assembly 115. The third wire segment is arranged between the driving housing 121 and the driven housing 111, one end of the third wire segment is electrically connected to the first wire segment after passing through the first wire through hole 1211d, and the other end of the third wire segment is electrically connected to the second wire segment after passing through the second wire through hole 1111a.

The electric control assembly 115 may include a circuit board, and a controller integrated on the circuit board. The driven module 11 may further include another bracket 116 arranged in the driven housing 111, and the electric control assembly 115 is mounted on the another bracket 116.

By designing the wire harness 15, the wire harness 15 passes through the first wire through hole 1211d and the second wire through hole 1111a in turn, and both ends of the wire harness 15 are electrically connected to the wiring port 1211c and the electric control assembly 115, respectively; an external cable 33 can achieve electric connection with the electric control assembly 115 by being electrically connected to the wiring port 1211c. In this way, it is convenient for an inspector to control the movement of the power apparatus 1 in the pipeline in real time outside the pipeline, and the operation is convenient.

Specifically, a wiring mode of the first wire segment in the driving housing 121 and a wiring mode of the second wire segment in the driven housing 111 may be, but are not limited to, the following situations.

In a first situation, as shown in FIG. 8, the driving module 12 further includes a wiring rack 126 arranged in the driving housing 121, and the first wire segment is lapped on the wiring rack 126. Here, a specific mounting way between the wiring rack 126 and the driving housing 121 (specifically the first housing 1211 described above) is not limited, and designers can make reasonable choices according to actual needs. For example, the wiring rack 126 may be detachably connected to the driving housing 121 by, but not limited to, at least one of bolting, clamping or inserting. For another example, the wiring rack 126 may also be connected to the driving housing 121 in a non-detachable manner by, but not limited to, gluing, injection molding or 3D printing. By designing the wiring rack 126, the first wire segment of the wire harness 15 is lapped on the wiring rack 126, so that the first wire segment of the wire harness 15 is not randomly arranged inside the driving housing 121, and the possibility that the first wire segment of the wire harness 15 is wound on the transmission unit 124 can be effectively reduced or even avoided.

Figure 16:
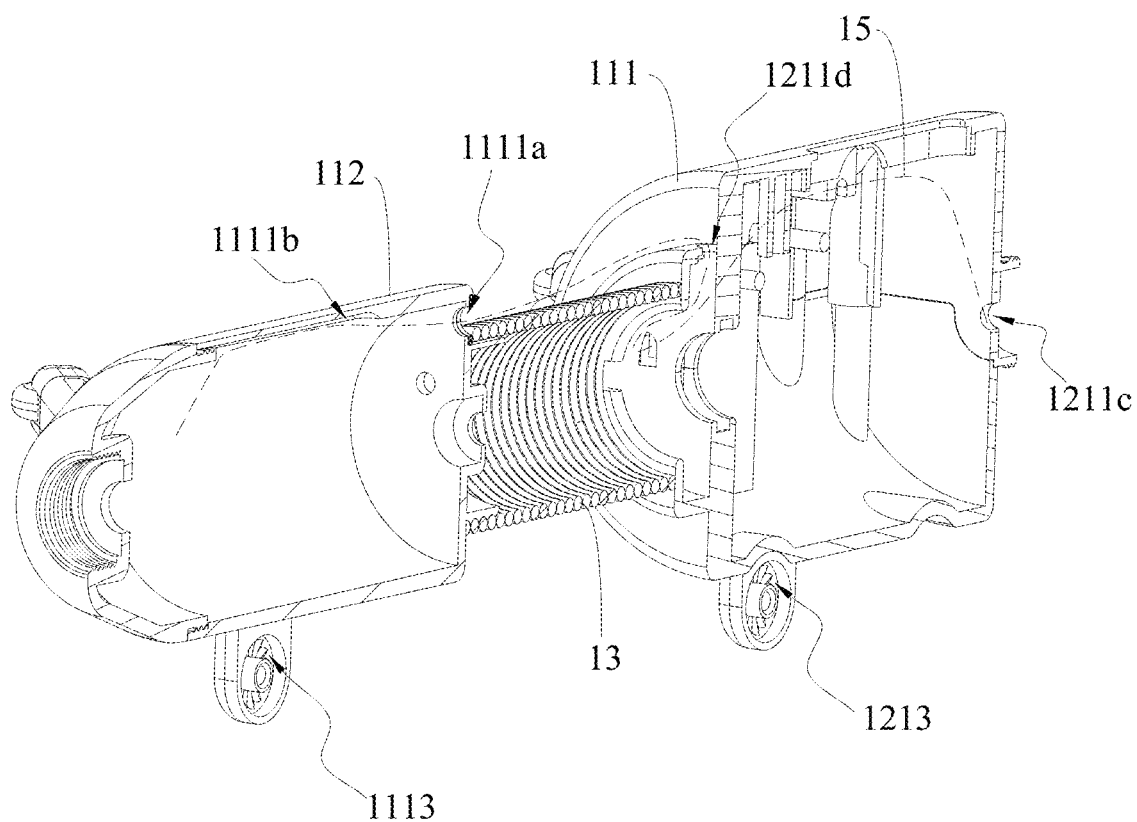
FIG. 16 is a diagram of sectional structures of a driving housing, an elastic connector and a driven housing according to an embodiment of the present disclosure.

In a second situation, as shown in FIG. 16, an inner wall surface of the driven housing 111 is provided with a wiring groove 1111b, and the second wire segment is arranged in the wiring groove 1111b. By designing the wiring groove 1111b, the second wire segment of the wire harness 15 is arranged in the wiring groove 111b, so that the second wire segment of the wire harness 15 is not randomly arranged inside the driven housing 111, and possibility that the second wire segment of the wire harness 15 is wound on the power source 113 can be effectively reduced or even avoided.

Figure 17:
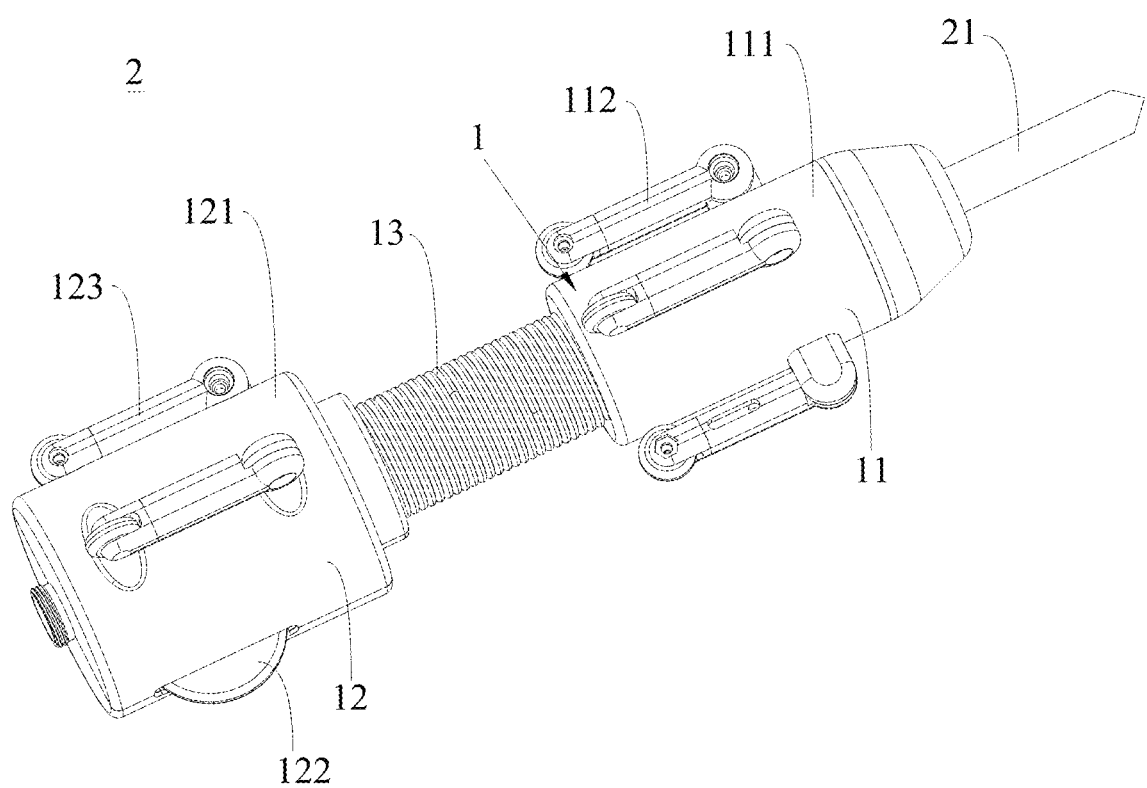
FIG. 17 is a structural diagram of a power endoscope device according to an embodiment of the present disclosure.

Please refer to FIG. 17, in a second aspect, the present disclosure provides a pipeline endoscope device 2. The pipeline endoscope device 2 includes an endoscope assembly 21, and the power apparatus 1 described above. The endoscope assembly 21 is mounted in a driven housing 111, and is configured to survey relevant data in the pipeline.

The pipeline endoscope device 2 in the embodiment of the present disclosure includes the power apparatus 1 described above, which can stably travel in the pipeline and effectively survey the relevant data in the pipeline through the endoscope assembly 21.

As shown in FIG. 17, one end, away from the elastic connector 13, of the driven housing 111 is provided with a fixing hole 1111c (shown in FIG. 15), the endoscope assembly 21 includes a probe and a fixing member connected to the probe, and the probe is configured to achieve detachable connection with the driven housing 111 through a connection between the fixing member and the fixing hole 1111c. The fixing hole 1111c may be a threaded hole, and in this configuration, the fixing member is a stud, and the probe can be detachably connected to the driven housing 111 through a threaded connection between the stud and the threaded hole. The fixing hole 1111c may also be a clamping hole, and in this configuration, the fixing member is a pin, and the probe can be detachably connected to the driven housing 111 through the pin and the clamping hole. The fixing hole 1111c may also be a socket, in this configuration, the fixing member is a bolt, and the probe can be detachably connected to the driven housing 111 through a plug-in connection with the socket. The probe designed as such can be detachably connected to the driven housing 111 by connecting the fixing member to the fixing hole 1111c, which is convenient for the inspector to effectively replace the damaged endoscope assembly 21 in the later stage.

Figure 18:
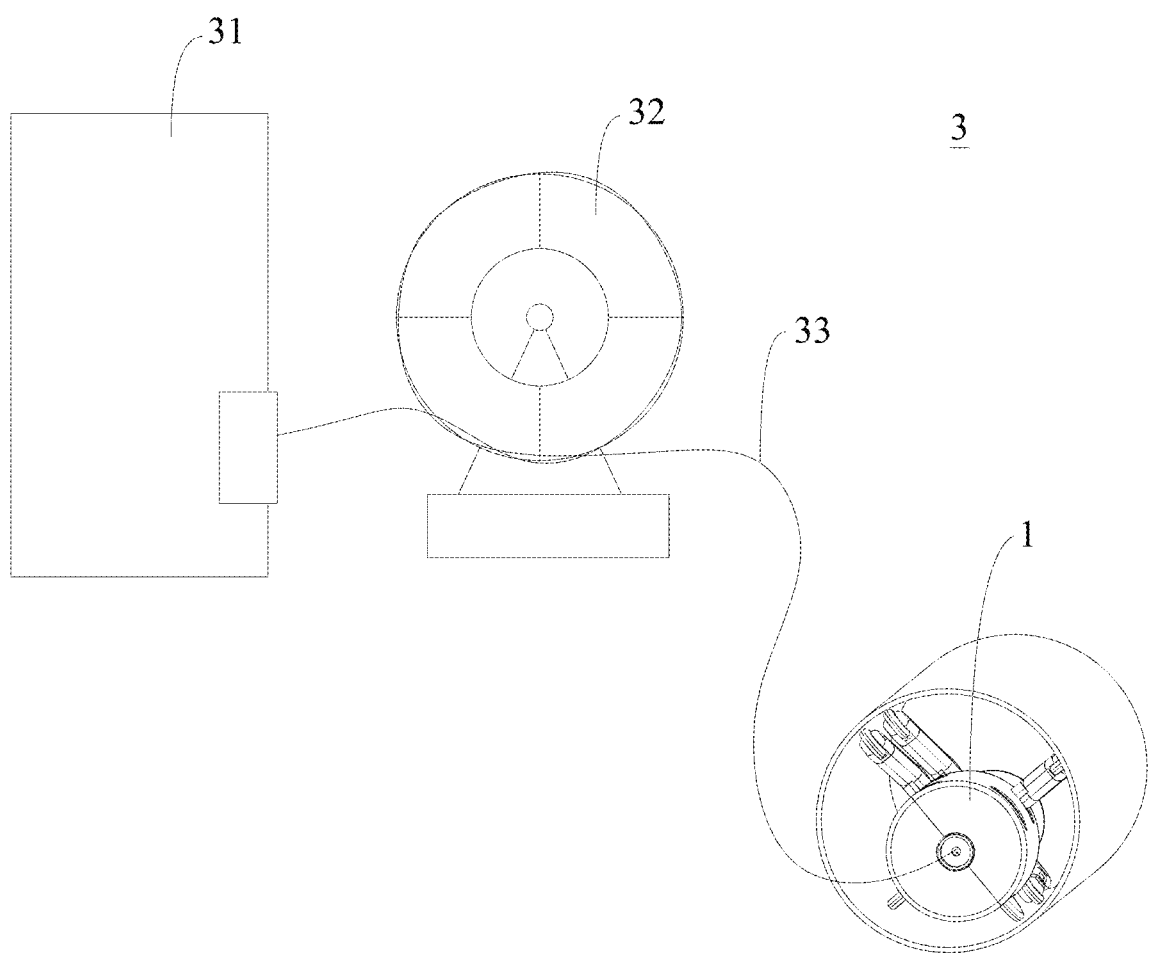
FIG. 18 is a structural diagram of a pipeline inspection system according to an embodiment of the present disclosure.

Please refer to FIG. 18, in a third aspect, the present disclosure provides a pipeline inspection system 3, including an electric control module 31, an external cable 33, and the pipeline endoscope device 2 described above. The pipeline endoscope device 2 is connected to the electric control module 31 by the external cable 33.

The pipeline inspection system 3 in the embodiment of the present disclosure has the pipeline endoscope device 2 described above. The pipeline endoscope device 2 can travel stably in the pipeline to effectively survey relevant data in the pipeline.

As shown in FIG. 18, the pipeline inspection system 3 further includes a bobbin 32 on which the external cable 33 is wound. By designing a bobbin 32, the external cable 33 is wound on the bobbin 32 to ensure storage regularity of the external cable 33.

The identical or similar numerals in the accompanying drawings in this embodiment correspond to identical or similar components. In the description of the present disclosure, it should be understood that orientations or positional relationships indicated by the terms "upper", "lower", "left", "right", and the like are orientations or positional relationships as shown in the drawings, and are only for the purpose of facilitating and simplifying the description of the present disclosure instead of indicating or implying that devices or elements indicated must have particular orientations, and be constructed and operated in the particular orientations, so that these terms for describing the positional relationships in the accompanying drawings are only used for exemplary illustrations and are not construed as limiting the present disclosure. A person of ordinary skill in the art can understand the specific meanings of the above terms according to specific situations.

The above is only the preferred embodiments of the present disclosure, and is not intended to limit the present disclosure. Any modifications, equivalent replacements and improvements that are made within the spirit and principle of the present disclosure shall fall within the protection scope of the present disclosure.

What is claimed is:

1. A power apparatus for a pipeline endoscope device, wherein the pipeline endoscope device further comprises an endoscope assembly, and the power apparatus includes:
    a driven module, comprising a driven housing and a plurality of driven support wheel sets, wherein the plurality of driven support wheel sets are mounted on the driven housing, an opening angle of the driven support wheel set relative to the driven housing is adjustable, and the endoscope assembly is mounted on the driven housing;
    a driving module, comprising a driving housing, a driving wheel, and a driving support wheel set, wherein the driving wheel is mounted on the driving housing, the driving support wheel set is mounted on the driving housing, and an opening angle of the driving support wheel set relative to the driving housing is adjustable; and
    an elastic connector, located between the driven housing and the driving housing and connected to the driven housing and the driving housing;
    wherein when the power apparatus travels in a pipeline, the driving wheel, the driven support wheel set and the driving support wheel set are configured to make contact with an inner wall surface of the pipeline;

a plurality of driving wheels are disposed, and the plurality of driving wheels comprise a first driving wheel and a second driving wheel; a plurality of driving support wheel sets are disposed, and the plurality of driving support wheel sets comprise a first driving support wheel set and a second driving support wheel set; the first driving wheel and the first driving support wheel set are arranged along a first diagonal line, the second driving wheel and the second driving support wheel set are arranged along a second diagonal line, and the first diagonal line intersects with the second diagonal line.

2. The power apparatus for a pipeline endoscope device according to claim 1, wherein the first diagonal line is perpendicular to the second diagonal line; and/or the first diagonal line and the second diagonal line intersect to form an intersection point, and the intersection point is a midpoint of the first diagonal line and the second diagonal line.

3. The power apparatus for a pipeline endoscope device according to claim 1, wherein a cross-section of the first driving wheel on a plane perpendicular to a rotational axis thereof is parallel or coincident with a plane where the first diagonal line is located; and/or a cross-section of the second driving wheel on a plane perpendicular to a rotational axis thereof is parallel or coincident with a plane where the second diagonal line is located.

4. The power apparatus for a pipeline endoscope device according to claim 1, wherein the driving support wheel set comprises:

a first support leg, comprising a first support section, a second support section, and a first elastic member, wherein the first support section is rotatably connected to the driving housing, the second support section forms an inner-outer nested telescopic structure with the first support section, the first elastic member is located in a telescopic space enclosed by the second support section and the first support section, and the first elastic member abuts against the second support section and the first support section; and a first driven wheel, fixedly connected to the second support section, wherein when the power apparatus travels in the pipeline, the first driven wheel is configured to make contact with the inner wall surface of the pipeline.

5. The power apparatus for a pipeline endoscope device according to claim 1, wherein the driven support wheel set comprises:

a second support leg, comprising a third support section, a fourth support section, and a second elastic member, wherein the third support section is rotatably connected to the driven housing, the fourth support section forms an inner-outer nested telescopic structure with the third support section, the second elastic member is located in a telescopic space enclosed by the fourth support section and the third support section, and the second elastic member abuts against the fourth support section and the third support section; and a second driven wheel, fixedly connected to the fourth support section, wherein when the power apparatus travels in the pipeline, the second driven wheel is configured to make contact with the inner wall surface of the pipeline.

6. The power apparatus for a pipeline endoscope device according to claim 1, wherein the driven module further comprises a power source, and the power source is arranged in the driven housing;

the driving module further comprises a transmission unit, the transmission unit is arranged in the driving housing, and is in transmission connection with the first driving wheel and the second driving wheel;

the elastic connector is of a cylindrical structure, the power apparatus further comprises a universal connecting rod located in a cylindrical cavity of the elastic connector, a first end of the universal connecting rod is connected to a drive end of the power source, and a second end of the universal connecting rod is connected to the transmission unit; the power source is configured to transmit a drive force to the transmission unit through the universal connecting rod, thereby enabling the transmission unit to drive the first driving wheel and the second driving wheel to rotate.

7. The power apparatus for a pipeline endoscope device according to claim 6, wherein the transmission unit comprises a driving bevel gear, a first driven bevel gear and a first gear set mounted in the driving housing, the driving bevel gear is connected to the second end of the universal connecting rod, the first driven bevel gear is meshed with the driving bevel gear, and the first gear set comprise at least two first sub-gears meshed with each other; one of the first sub-gears in the first gear set is coaxially and fixedly connected to the first driven bevel gear, and the other of the first sub-gears in the first gear set is fixedly connected to an axle of the first driving wheel.

8. The power apparatus for a pipeline endoscope device according to claim 7, wherein the transmission unit comprises a second driven bevel gear and a second gear set mounted in the driving housing, the second driven bevel gear is meshed with the driving bevel gear, and the second gear set comprise at least two second sub-gears meshed with each other; one of the second sub-gears in the second gear set is coaxially and fixedly connected to the second driven bevel gear, and the other of the second sub-gears in the second gear set is fixedly connected to an axle of the second driving wheel.

9. The power apparatus for a pipeline endoscope device according to claim 6, wherein the driving module further comprises a mounting plate arranged in the driving housing, the transmission unit is mounted on the mounting plate, the inside of the mounting plate is hollow to form a first accommodation cavity and a second accommodation cavity, the driving housing is provided with a first opening corresponding to a cavity opening of the first accommodation cavity, and a second opening corresponding to a cavity opening of the second accommodation cavity; the first driving wheel passes through the first opening and partially extends into the first accommodation cavity, and the first driving wheel is rotatably connected to the mounting plate; the second driving wheel passes through the second opening and partially extends into the second accommodation cavity, and the second driving wheel is rotatably connected to the mounting plate.

10. The power apparatus for a pipeline endoscope device according to claim 6, wherein the driven module further comprises a bracket arranged in the driven housing, the power source comprises a motor and a speed reducer, the motor and the speed reducer are respectively arranged on both sides of the bracket in a traveling direction of the power apparatus, the motor is mounted on the bracket, a motor shaft of the motor is connected to the speed reducer, and a rotating shaft of the speed reducer is connected to the first end of the universal connecting rod as the drive end.

11. The power apparatus for a pipeline endoscope device according to claim 1, wherein the power apparatus is suitable for traveling in a pipeline with a radial dimension of greater than or equal to 10 cm and smaller than or equal to 15 cm.

12. A power apparatus for a pipeline endoscope device, wherein the pipeline endoscope device further comprises an endoscope assembly, and the power apparatus includes:

a driven module, comprising a driven housing and a plurality of driven support wheel sets, wherein the plurality of driven support wheel sets are mounted on the driven housing, an opening angle of the driven support wheel set relative to the driven housing is adjustable, and the endoscope assembly is mounted on the driven housing;

a driving module, comprising a driving housing, a driving wheel, and a driving support wheel set, wherein the driving wheel is mounted on the driving housing, the driving support wheel set is mounted on the driving housing, and an opening angle of the driving support wheel set relative to the driving housing is adjustable; and an elastic connector, located between the driven housing and the driving housing and connected to the driven housing and the driving housing;

wherein when the power apparatus travels in a pipeline, the driving wheel, the driven support wheel set and the driving support wheel set are configured to make contact with an inner wall surface of the pipeline;

wherein the driving support wheel set comprises a first support leg comprising a first support section rotatably connected to the driving housing;

the driving housing comprises a first housing connected to the elastic connector, and a first connecting portion arranged on the first housing; the first connecting portion is provided with one of a plurality of first teeth and a plurality of first slots arranged around a rotational axis of the first support section;

the first support section comprises a first support rod, and a second connecting portion arranged on the first support rod; the second connecting portion is rotatably connected to the first connecting portion, the second connecting portion is provided with the other of the plurality of first teeth and the plurality of first slots arranged around a rotational axis thereof, and the plurality of first teeth are engaged with the plurality of first slots in a one-to-one correspondence.

13. A power apparatus for a pipeline endoscope device, wherein the pipeline endoscope device further comprises an endoscope assembly, and the power apparatus includes:

a driven module, comprising a driven housing and a plurality of driven support wheel sets, wherein the plurality of driven support wheel sets are mounted on the driven housing, an opening angle of the driven support wheel set relative to the driven housing is adjustable, and the endoscope assembly is mounted on the driven housing;

a driving module, comprising a driving housing, a driving wheel, and a driving support wheel set, wherein the driving wheel is mounted on the driving housing, the driving support wheel set is mounted on the driving housing, and an opening angle of the driving support wheel set relative to the driving housing is adjustable; and an elastic connector, located between the driven housing and the driving housing and connected to the driven housing and the driving housing;

wherein when the power apparatus travels in a pipeline, the driving wheel, the driven support wheel set and the driving support wheel set are configured to make contact with an inner wall surface of the pipeline;

wherein the driven support wheel set comprises a second support leg comprising a third support section rotatably connected to the driven housing;

the driven housing comprises a second housing connected to the elastic connector, and a third connecting portion arranged on the second housing; the third connecting portion is provided with one of a plurality of second teeth and a plurality of second slots arranged around a rotational axis of the third support section;

the third support section comprises a second support rod, and a fourth connecting portion arranged on the second support rod; the fourth connecting portion is rotatably connected to the third connecting portion, the fourth connecting portion is provided with the other of the plurality of second teeth and the plurality of second slots arranged around the rotational axis, and the plurality of second teeth are engaged with the plurality of second slots in a one-to-one correspondence.

14. A power apparatus for a pipeline endoscope device, wherein the pipeline endoscope device further comprises an endoscope assembly, and the power apparatus includes:

a driven module, comprising a driven housing and a plurality of driven support wheel sets, wherein the plurality of driven support wheel sets are mounted on the driven housing, an opening angle of the driven support wheel set relative to the driven housing is adjustable, and the endoscope assembly is mounted on the driven housing;

a driving module, comprising a driving housing, a driving wheel, and a driving support wheel set, wherein the driving wheel is mounted on the driving housing, the driving support wheel set is mounted on the driving housing, and an opening angle of the driving support wheel set relative to the driving housing is adjustable; and an elastic connector, located between the driven housing and the driving housing and connected to the driven housing and the driving housing;

wherein when the power apparatus travels in a pipeline, the driving wheel, the driven support wheel set and the driving support wheel set are configured to make contact with an inner wall surface of the pipeline;

wherein the driving housing is provided with a wiring port and a first wire through hole; the wiring port is formed in one end, away from the elastic connector, of the driving housing, and the first wire through hole is formed in one end, adjacent to the elastic connector, of the driving housing; the driven housing is provided with a second wire through hole which is formed in one end, close to the elastic connector, of the driven housing;

the driven module further comprises an electric control assembly, and the electric control assembly is arranged in the driven housing; the power apparatus further comprises a wire harness, the wire harness comprises a first wire segment, a second wire segment, and a third wire segment; the first wire segment is arranged in the driving housing and electrically connected to the wiring port; the second wire segment is arranged in the driven housing and electrically connected to the electronic control assembly; and the third wire segment is arranged between the driving housing and the driven housing, one end of the third wire segment is electrically connected to the first wire segment after passing through the first wire through hole, and the other end of the third wire segment is electrically connected to the second wire segment after passing through the second wire through hole.

15. The power apparatus for a pipeline endoscope device according to claim 14, wherein the driving module further comprises a wiring rack arranged in the driving housing, and the first wire segment is lapped on the wiring rack; and/or an inner wall surface of the driven housing is provided with a wiring groove, and the second wire segment is arranged in the wiring groove.

16. A pipeline endoscope device, comprising:

a power apparatus comprising:

a driven module, comprising a driven housing and a plurality of driven support wheel sets, wherein the plurality of driven support wheel sets are mounted on the driven housing, an opening angle of the driven support wheel set relative to the driven housing is adjustable, and the endoscope assembly is mounted on the driven housing;

a driving module, comprising a driving housing, a driving wheel, and a driving support wheel set, wherein the driving wheel is mounted on the driving housing, the driving support wheel set is mounted on the driving housing, and an opening angle of the driving support wheel set relative to the driving housing is adjustable; and an elastic connector, located between the driven housing and the driving housing and connected to the driven housing and the driving housing;

wherein when the power apparatus travels in a pipeline, the driving wheel, the driven support wheel set and the driving support wheel set are configured to make contact with an inner wall surface of the pipeline; and an endoscope assembly, mounted in a driven housing and configured to survey relevant data in a pipeline;

wherein one end, away from the elastic connector, of the driven housing is provided with a fixing hole, the endoscope assembly comprises a probe and a fixing member connected to the probe, and the probe is configured to achieve detachable connection with the driven housing through a connection between the fixing member and the fixing hole.

17. A pipeline inspection system, comprising:

an electric control module;

an external cable; and the pipeline endoscope device according to claim 16, wherein the pipeline endoscope device is connected to the electric control module through the external cable.

18. The pipeline inspection system according to claim 17, wherein the pipeline inspection system further comprises a bobbin on which the external cable is wound.

\* \* \* \* \*